United States Patent
Atrazhev et al.

(10) Patent No.: US 8,428,918 B2
(45) Date of Patent: Apr. 23, 2013

(54) SYSTEM AND METHOD FOR OCCUPANCY ESTIMATION

(75) Inventors: Vadim Atrazhev, Moscow (RU); Sergei F. Burlatsky, West Hartford, CT (US); Oleg A. Vasilyev, Moscow (RU); Nikolay S. Erikhman, Moscow (RU); Robert N. Tomastik, Rocky Hill, CT (US)

(73) Assignee: UTC Fire & Security Corporation, Farmington, CT (US)

( * ) Notice: Subject to any disclaimer, the term of this patent is extended or adjusted under 35 U.S.C. 154(b) by 178 days.

(21) Appl. No.: 12/734,068

(22) PCT Filed: Feb. 26, 2008

(86) PCT No.: PCT/US2008/002528
§ 371 (c)(1),
(2), (4) Date: Sep. 15, 2010

(87) PCT Pub. No.: WO2009/038598
PCT Pub. Date: Mar. 26, 2009

(65) Prior Publication Data
US 2011/0007944 A1    Jan. 13, 2011

Related U.S. Application Data

(63) Continuation-in-part of application No. PCT/US2007/020291, filed on Sep. 19, 2007.

(51) Int. Cl.
G06F 17/10    (2006.01)
G08G 1/095    (2006.01)

(52) U.S. Cl.
USPC .................... 703/2; 703/6; 382/103

(58) Field of Classification Search .............. 703/2, 6; 382/103; 702/189
See application file for complete search history.

(56) References Cited

U.S. PATENT DOCUMENTS

| | | | |
|---|---|---|---|
| 5,335,180 A | 8/1994 | Takahashi et al. | |
| 5,790,019 A | 8/1998 | Edwin | |
| 6,073,262 A | 6/2000 | Larkin et al. | |
| 6,078,253 A * | 6/2000 | Fowler | 340/501 |
| 6,314,204 B1 | 11/2001 | Cham et al. | |
| 6,499,025 B1 | 12/2002 | Horvitz et al. | |
| 6,615,175 B1 * | 9/2003 | Gazdzinski | 704/275 |

(Continued)

FOREIGN PATENT DOCUMENTS
EP    1717554 A2    2/2006

OTHER PUBLICATIONS

Chen et al, Causes and Cures of Highway Congestion, IEEE Control Systems, vol. 21, No. 6, 2001, pp. 26-32.*

(Continued)

*Primary Examiner* — Russell Frejd
(74) *Attorney, Agent, or Firm* — MH2 Technology Law Group, LLP

(57) ABSTRACT

A system generates occupancy estimates based on a Kinetic-Motion (KM)-based model that predicts the movements of occupants through a region divided into a plurality of segments. The system includes a controller for executing an algorithm representing the KM-based model. The KM-based model includes state equations that define each of the plurality of segments as containing congested portions and uncongested portions. The state equations define the movement of occupants based, in part, on the distinctions made between congested and uncongested portions of each segment.

30 Claims, 10 Drawing Sheets

U.S. PATENT DOCUMENTS

| | | | |
|---|---|---|---|
| 7,035,764 | B2 | 4/2006 | Rui et al. |
| 7,068,599 | B1 | 6/2006 | Jiang et al. |
| 7,109,685 | B2 | 9/2006 | Tate, Jr. et al. |
| 7,139,409 | B2 | 11/2006 | Paragios et al. |
| 7,688,212 | B2 | 3/2010 | Farley |
| 2003/0069002 | A1 | 4/2003 | Hunter et al. |
| 2003/0215141 | A1 | 11/2003 | Zakrzewski et al. |
| 2003/0234725 | A1 | 12/2003 | Lemelson et al. |
| 2004/0249597 | A1 | 12/2004 | Whitehead |
| 2005/0078852 | A1 | 4/2005 | Buehler |
| 2005/0128070 | A1 | 6/2005 | Faltesek et al. |
| 2005/0190053 | A1 | 9/2005 | Dione |
| 2005/0201591 | A1 | 9/2005 | Kiselewich |
| 2006/0062429 | A1 | 3/2006 | Ramaswamy et al. |
| 2006/0088013 | A1 | 4/2006 | Ganesh |
| 2006/0227862 | A1 | 10/2006 | Campbell et al. |
| 2007/0003141 | A1 | 1/2007 | Rittscher et al. |
| 2007/0027612 | A1 | 2/2007 | Barfoot et al. |
| 2007/0031005 | A1 | 2/2007 | Paragios et al. |
| 2007/0096896 | A1 | 5/2007 | Zingelewicz et al. |
| 2010/0299116 | A1 | 11/2010 | Tomastik et al. |
| 2011/0213588 | A1 | 9/2011 | Lin et al. |

OTHER PUBLICATIONS

Caliskan et al, Predicting Parking Lot Occupancy in Vehicular Ad Hoc Networks, IEEE 65$^{th}$ Vehicular Technology Conference, VTC2007-Spring, 2007 pp. 277-281.*

Fleuret et al, Multi-Camera People Tracking with a Probabilistic Occupancy Map [online], Mar. 27, 2007, pp. 1-35.*

Anderson et al, Tracking of Interacting People and Their Body Parts for Outdoor Surveillance [online], Jun. 17, 2005, pp. 1-126.*

Tomastik, "Agent-Based Simulation Model of People Movement in Buildings, Egress Project," Jun. 2006, pp. 1-12.

Unknown Author, "Int'l Search Report and Written Opinion of the Int'l Searching Authority," for Int'l Appl. No. PCT/US07/20291 (filed Sep. 19, 2007), dated Apr. 21, 2008, pp. 1-11, published worldwide by WIPO on the Internet.

Unknown Author, "Int'l Search Report and Written Opinion of the Int'l Searching Authority," for Int'l Appl. No. PCT/US07/20315 (filed Sep. 19, 2007), dated Mar. 31, 2008, pp. 1-8, published worldwide by WIPO on the internet.

Unknown Author, "Int'l Search Report and Written Opinion of the Int'l Searching Authority," for Int'l Appl. No. PCT/US07/20279 (filed Sep. 19, 2007), dated Feb. 27, 2008, pp. 1-8, published worldwide by WIPO on the internet.

Unknown Author, "Int'l Search Report and Written Opinion of the Int'l Searching Authority," for Int'l Appl. No. PCT/US07/20393 (filed Sep. 20, 2007), dated Apr. 18, 2008, pp. 1-15, published worldwide by WIPO on the Internet.

Unknown Author, "Int'l Search Report and Written Opinion of the Int'l Searching Authority," for Int'l Appl. No. PCT/US08/12580 (filed Nov. 7, 2008), dated Jan. 8, 2009, pp. 1-9, published worldwide by WIPO on the internet.

Unknown Author, "Int'l Search Report and Written Opinion of the Int'l Searching Authority," for Int'l Appl. No. PCT/US08/02528 (filed Feb. 26, 2008), dated Jul. 1, 2008, pp. 1-10, published worldwide by WIPO on the internet.

Unknown Author, "Int'l Search Report and Written Opinion of the Int'l Searching Authority," for Int'l Appl. No. PCT/US08/02520 (filed Feb. 26, 2008), dated Jul. 1, 2008, pp. 1-9, published worldwide by WIPO on the internet.

Yang, Danny B. et al. "Counting People in Crowds with a Real-Time Network of Simple Image Sensors," Proc. IEEE International Conference on Computer Vision, 2003, pp. 122-129, IEEE, USA.

Bobruk, Joshua et al. "Laser Motion Detection and Hypothesis Tracking From a Mobile Platform," Proc. of the 2004 Australian Conference on Robotics & Automation, 2004, pp. 1-10, Australian Conference on Robotics & Automation, Australia.

Meyn, Sean et al. "Estimator based on sensor networks and path utility (and stimulator)," date unknown, pp. 1-5, publisher unknown.

Unknown Author, "Geometric distribution," Wikipedia webpage, Sep. 15, 2008, retrieved Oct. 2, 2008 from <http://en.wikipedia.org/wiki/Geometric_distribution>, pp. 1-4, published worldwide by wikipedia on the internet.

Unknown Author, "Constraint satisfaction," Wikipedia webpage, Sep. 30, 2008, retrieved Oct. 7, 2008 from <http://en.wikipedia.org/wiki/Constraint_satisfaction>, pp. 1-3, published worldwide by wikipedia on the internet.

Unknown Author, "Poisson distribution," Wikipedia webpage, Sep. 26, 2008, retrieved Oct. 7, 2008 from <http://en.wikipedia.org/wiki/Poisson_distribution>, pp. 1-7, published worldwide by wikipedia on the internet.

Unknown Author, "Optimization problem," Wikipedia webpage, Oct. 4, 2008, retrieved Oct. 7, 2008 from <http://en.wikipedia.org/wiki/Optimization_problem>, pp. 1-2, published worldwide by wikipedia on the internet.

Yoo, Yerin, "Tutorial on Fourier Theory," Mar. 2001, pp. 1-18, published worldwide by various sites on the internet, including <http://www.cs.otago.ac.nz/cosc453/student_tutorials/fourier_analysis.pdf>.

Fleuret, Francois, et al. "Multi-Camera People Tracking with Probabilistic Occupancy Map," IEEE Transactions on Pattern Analysis and Machine Intelligence, Mar. 27, 2007, pp. 1-35, IEEE, USA.

Andersen, Preben Fihl et al., "Tracking of Interacting People and Their Body Parts for Outdoor Surveillance," Jun. 17, 2005, pp. 1-134, Aalborg University, Denmark.

Blever, Celeste, "Buildings could save energy by spying on inhabitants," New Scientist webpage, Apr. 2007, retrieved Mar. 18, 2010 from <http://www.newscientist.com/article/dn11734>, pp. 1-2, published worldwide by New Scientist on the internet.

* cited by examiner

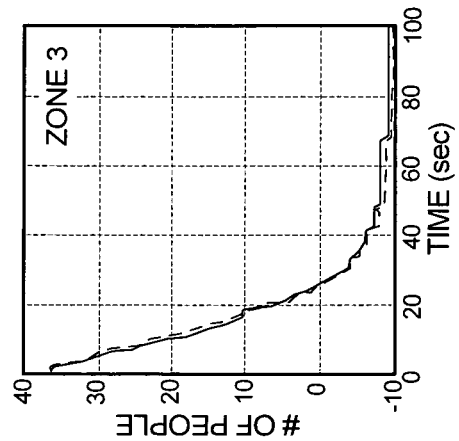
FIG. 7A
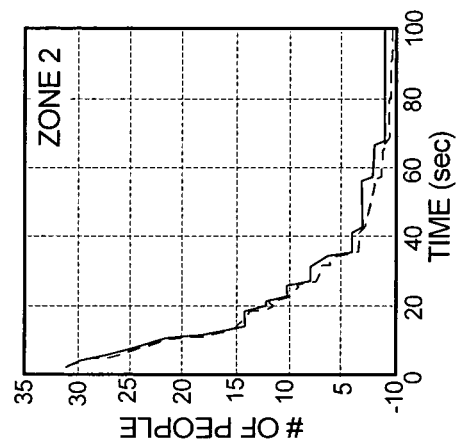
FIG. 7B
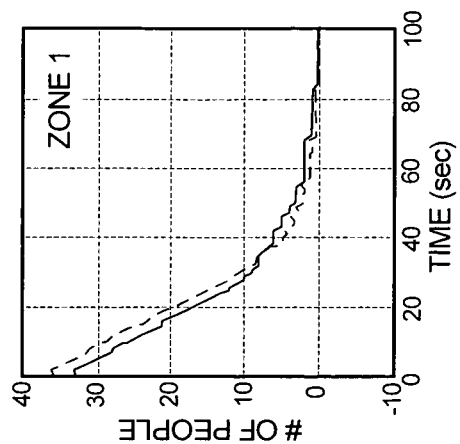
FIG. 7C
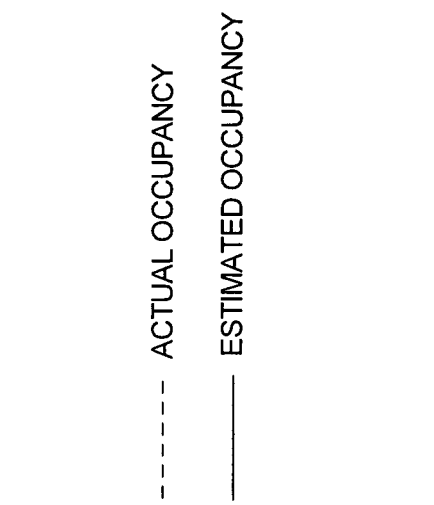
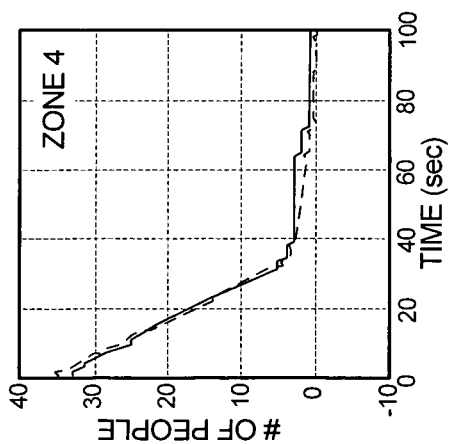
FIG. 7D
FIG. 7E

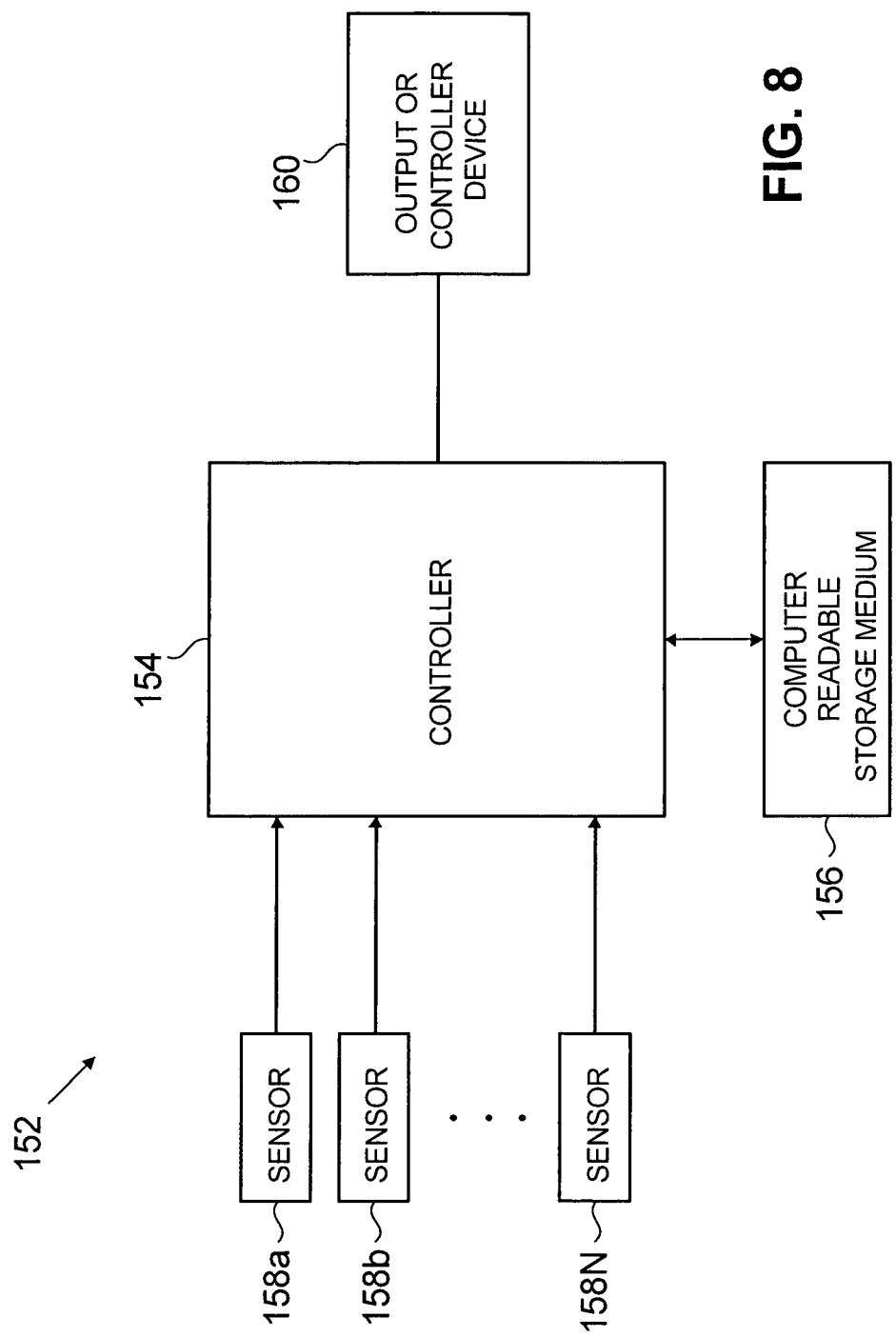

SYSTEM AND METHOD FOR OCCUPANCY ESTIMATION

BACKGROUND

The present invention is related to estimating occupancy of a region, and more specifically to estimating occupancy of people within the region based on occupant traffic models.

Knowledge regarding the occupancy of a particular region can be useful in a variety of applications. For instance, knowledge of occupancy within a building can be used to improve the efficiency, comfort, and convenience of a building and in emergency situations to improve search and rescue efforts of first responders by providing information regarding the location of occupants. Typically, building occupancy is determined based solely on data provided by sensors. These occupancy estimates may result in the generation of errors due to loss of sensor data or accumulation of errors in the sensor data over time.

SUMMARY

Described herein is a system for estimating occupancy in a region. The system includes a controller for executing an algorithm that generates occupancy estimations associated with the predicted movement of occupants within each of the plurality of segments. The algorithm is a Kinetic Motion (KM)-based model predicts occupant movement based on modeled distinctions between congested and uncongested portions of each segment. The system further includes an output operably connected to the controller to communicate the occupancy estimates generated by the algorithm.

In another aspect, described herein is a method of estimating occupancy in a region dividing into a plurality of segments. The method includes modeling each of the plurality of segments as containing a congested portion and an uncongested portion. The method further includes calculating model-based predictions of occupancy within the plurality of segments based on state equations that model occupant movement in the congested portion of each segment, occupant movement in the uncongested portion of each segment, and occupant movement between segments based, in part, on whether an entrance to a particular segment is modeled as congested or uncongested.

In another aspect, described herein is a system for estimating occupancy in a region divided into a plurality of segments. The system includes means for modeling each of the plurality of segments as containing a congested portion and uncongested portion. The system further includes means for calculating model-based predictions of occupancy within the plurality of segments based on state equations that model occupant movement in the congested portion of each segment, occupant movement in the uncongested portion of each segment, and occupant movement between segments based, in part, on whether an entrance to a particular segment is modeled as congested or uncongested In another aspect, described herein is a computer readable storage medium encoded with a machine-readable computer program code for generating occupancy estimates for a region, the computer readable storage medium including instructions for causing a controller to implement a method. The computer program includes instructions for modeling each of the plurality of segments as containing a congested portion and uncongested portion. The computer program also includes instructions for calculating model-based predictions of occupancy within the plurality of segments based on state equations that model occupant movement in the congested portion of each segment, occupant movement in the uncongested portion of each segment, and occupant movement between segments based, in part, on whether an entrance to a particular segment is modeled as congested or uncongested.

BRIEF DESCRIPTION OF THE DRAWINGS

FIGS. 7A-7E are graphs illustrating the estimation accuracy of an embodiment of the Extended Kalman Filter.

FIG. 8 is a block diagram illustrating a centralized occupancy estimation system.

DETAILED DESCRIPTION

Figure 1A:
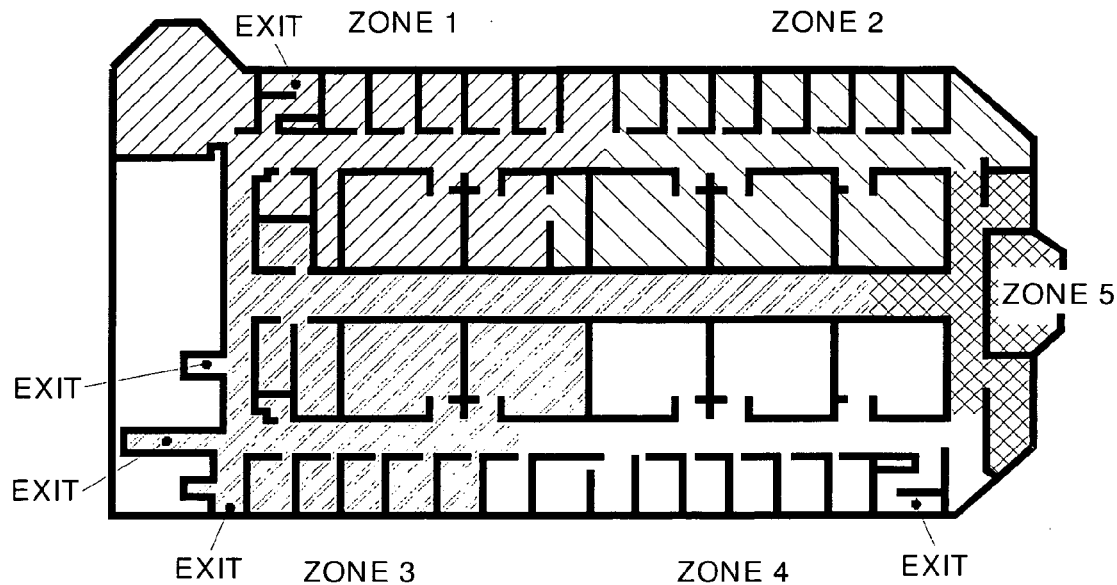
FIG. 1A is a schematic of a floor of a building divided into a number of zones.

This application discloses a system and method related to the application titled "System and Method for Occupancy Estimation," by Robert Tomastik, filed on Sep. 19, 2007 and assigned PCT serial number U.S. 07/20291. The application discloses a system and method for estimating occupancy based on an occupant traffic model. In an exemplary embodiment, occupancy is estimated based solely on the occupant traffic model. In another exemplary embodiment, occupancy is estimated based on a prediction of occupancy generated by an occupant traffic model, which is corrected based on received sensor data. This application expands upon the scope of the previous application, disclosing additional embodiments and methods of implementing occupant estimation.

The occupant traffic model seeks to predict how occupants will move throughout a region. In one embodiment, the occupant traffic model is a single-phase occupant traffic model that predicts the movement of occupants based on models of how occupants can flow from one region to another. In another embodiment, the occupant traffic model is a kinetic motion (KM)-based model that uses a two-phased approach to modeling how occupants move between adjacent regions. In particular, the two-phased approach takes into account how traffic congestion affects the movement of occupants through a region.

In both cases, the occupant traffic model is based on historical or expected traffic patterns of occupants throughout the area or region and may take into account factors such as layout of the region or building. For example, building layout may include information describing the location of exits, hallways, offices, and occupancy limits of associated hallways and offices. In addition, the occupant traffic model may be a mathematical model, a statistical model, or a computer simulation describing the predicted movement or traffic patterns of occupants within a region.

In an exemplary embodiment, the estimates generated by the occupant traffic model are employed in conjunction with sensor data to generate occupancy estimates. Sensor data may be provided by a variety of different types of sensor devices, each providing a different type of sensor output that is analyzed to detect occupant movements or locations throughout an area or region. To this end, the present invention discloses an occupancy estimator that takes as input both the sensor data and occupant traffic models, and executes an algorithm to generate an occupancy estimate for the area or region based on the provided inputs. The occupancy estimate based on both the sensor data and the occupant traffic models provides an occupancy estimation that is more accurate than the result of estimations based solely on sensor data or based solely on a model. In addition to the benefit of providing a more accurate estimation of occupancy and movement and changes thereto, the combination of sensor data with an occupant traffic model allows for the continued estimation of building occupancy despite the loss of data from one or more sensors, or pause in transmission of sensor data. This may be particularly beneficial in emergency situations in which sensors may be disabled or destroyed.

In another exemplary embodiment, the occupant traffic model operates as a stand-alone tool in estimating occupancy (e.g., without sensor data feedback). This embodiment is particularly well-suited to egress modes of operation in which occupants can be expected to move towards defined exits.

Figure 1B:
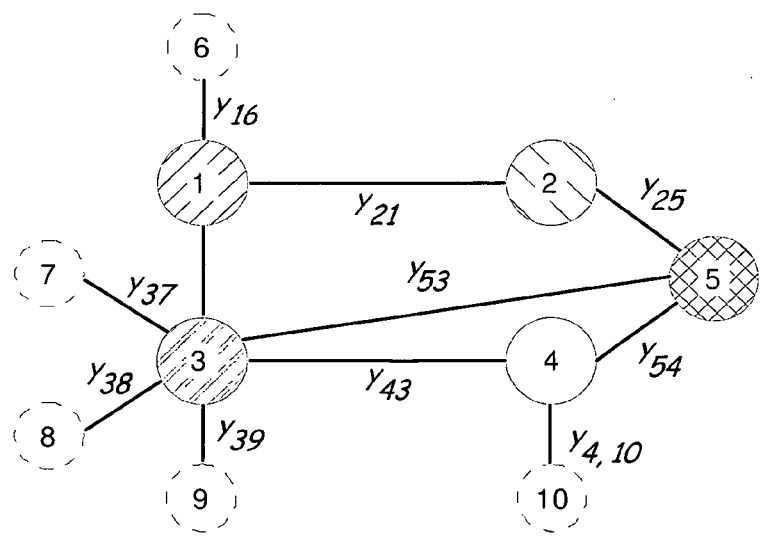
FIG. 1B is a diagram modeling the connection between zones of the building floor.

FIGS. 1A and 1B illustrate an example that will be used throughout this description to aid in describing the occupancy estimation algorithm, in which occupancy estimations are made for a particular floor of a building. The concepts described with respect to this embodiment could be applied in a variety of settings or locations (e.g., outdoors, train stations, airports, etc.). FIG. 1A illustrates the layout of a single floor in an office building. In this embodiment, the floor plan has been divided into five separate zones (labeled zones 1, 2, 3, 4 and 5). In another embodiment, the floor plan is further sub-divided based on the location of individual offices and rooms (i.e., site-based sub-divisions). In the zonal model illustrated in FIGS. 1A and 1B, the border between each adjacent zone 1-5 and at each exit includes a sensor (not shown) for detecting the movement of occupants from one zone to another. In other embodiments, additional sensors may be located in each zone to improve the resolution, reliability, and/or accuracy of occupancy estimates, or if a sensor at the border is not present or is not functioning.

FIG. 1B is a diagram illustrating the five zones defined in FIG. 1A. The large circles labeled 1, 2, 3, 4 and 5 represent the five zones, and the smaller circles labeled 6, 7, 8, 9 and 10 represent the exits from the building. The lines connecting zones indicate the presence of passages or hallways connecting adjacent zones. The number of occupants moving between adjacent zones is represented by the variable $y_{i,j}(t)$. The number of occupants located in a particular zone is represented by the variable $x_i(t)$ (not shown in FIG. 1B).

The term 'region' is used throughout the description to refer to both a region as well as various sub-divisions of the region. For instance, in the exemplary embodiment shown in FIGS. 1A and 1B, the term 'region' refers to both the floor plan in general as well as to the individual sub-regions or zones 1-5. Therefore, generating an occupancy estimate for the region would include generating occupancy estimates for each of the individual zones.

In addition, the term 'occupancy estimate' is used throughout the description and refers generally to output related to occupancy. Therefore, an occupancy estimate for a region may include data such as a mean estimate of the number of occupants within the region, a probability associated with all possible occupancy levels associated with the region changes in occupancy, data indicative of the reliability of confidence associated with an estimate of occupancy (e.g., covariance), as well as other similarly useful data related to occupancy. Therefore, in the example shown in FIGS. 1A and 1B an occupancy estimate generated for a region would include any of the above-listed data generated for each of the zones 1-5.

Figure 2:
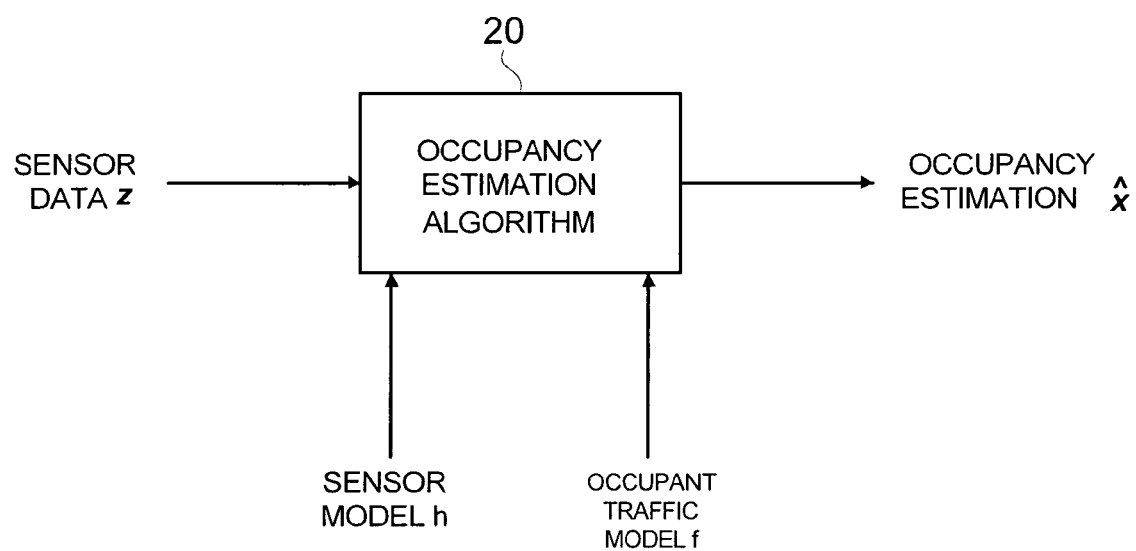
FIG. 2 is a flowchart illustrating the calculation of occupancy estimates based on sensor data, sensor models, and occupant traffic models.

FIG. 2 is a high-level block diagram illustrating an exemplary embodiment of the inputs provided to occupancy estimation algorithm 20. Inputs provided to occupancy estimation algorithm 20 include sensor data z (provided by one or more sensor devices), sensor model h, and occupant traffic model f. Occupancy estimation algorithm 20 derives an occupancy estimation $\hat{x}$ based on sensor data z, sensor model h, and occupant traffic model f. For instance, in the exemplary embodiment shown in FIGS. 1A and 1B, occupancy estimation algorithm 20 generates an occupancy estimate $\hat{x}$ for each of the five zones. In other embodiments, estimates are made for each room in a particular floor plan. In an exemplary embodiment, sensor data z and occupancy estimate $\hat{x}$ are represented as vectors, although in other exemplary embodiments sensor data may be provided in other suitable formats. Occupant traffic model f is a mathematical, computer simulation, or statistical model used to predict expected traffic patterns of occupants throughout a region, where such model may use a previous estimate of occupancy in the region. For example, occupant traffic model f may be applied to a previous estimate of occupancy in each zone of the building to generate a predicted or model-based estimate of the occupancy in each zone of the building.

The model-based estimate of occupancy generated by applying the occupant traffic model f (e.g., either the single-phase model or the KM-based model) is then combined with sensor data z (if available) by occupancy estimation algorithm 20. Occupancy estimation algorithm 20 combines the model-based estimate of occupancy provided by the occupant traffic model f with the sensor data z by assigning weights to the respective inputs based on the predicted reliability of each. For example, if the sensor data z is determined to be highly reliable, then occupancy estimation algorithm 20 assigns a higher weight to the sensor data z and the corresponding occupancy estimation $\hat{x}$ is based in large part on the provided sensor data z. Vice versa, if the sensor data z is determined to be highly unreliable, then more weight is given to the model-based occupancy estimate provided by the occupant traffic model f.

Based on the model-based occupancy estimate, the sensor data z, and the weighting associated with both of these inputs, occupancy estimation algorithm 20 generates an occupancy estimate $\hat{x}$ for a region. For instance, with respect to the floor plan shown in FIGS. 1A and 1B, generation of an occupancy estimate $\hat{x}$ for the region may include generating an occupancy estimate for each of the five zones 1-5. In addition, the occupancy estimate $\hat{x}$ may include data such as the mean occupancy estimate associated with each of the five zones, the probability associated with each possible level of occupancy for each of the five zones, data related to movement of occupants within or between each of the five zones, as well as reliability associated with the above estimate for each of the five zones (e.g. a covariance value).

In addition, data generated as part of the occupancy estimate $\hat{x}$ may be interrelated to one another. For instance, the probability of occupancy in a region may be described as a probability distribution by a probability distribution function (PDF) that defines the likelihood associated with each possible state or occupancy level. The peak of the curve would represent the most likely estimate of the occupancy associated with the zone, but in addition, the shape of the curve (e.g., the standard deviation associated with the curve) would provide an indication of the confidence or reliability associated with the occupancy estimate. In other embodiments, the occupancy estimate $\hat{x}$ may include a confidence interval associated with the estimate, a covariance associated with the occupancy estimate, or other reliability calculations that indicate the confidence or reliability associated with an occupancy estimate $\hat{x}$.

In an exemplary embodiment the occupancy estimate $\hat{x}$ generated by occupancy estimation algorithm 20 is generated in real-time, allowing the occupancy estimate to be used in real-time applications (e.g., as input to first responders). In an exemplary embodiment, the occupancy estimate $\hat{x}$ may be used for forensic or after the fact estimates of occupancy within a building. In yet another exemplary embodiment, the occupancy estimate $\hat{x}$ can be used to predict occupancy estimates into the near future. Near future occupancy estimates may be useful in controlling applications such as elevator calls based on the expected near future movements of occupants within a building. Near future occupancy estimates may also be useful to first responders to provide data regarding not only the present location of occupants but the likely future location of building occupants.

In an exemplary embodiment, occupancy estimation algorithm 20 is an Extended Kalman Filter (EKF), which is a well known algorithm used to generate state estimates of a system based on observations and models. In other embodiments, other types of filters capable of combining sensor data and model-based estimates may be employed (e.g., traditional Kalman filter). A benefit of the EKF is the ability to provide calculations based on received sensor data z and occupant traffic models f in real-time. In an exemplary embodiment, the EKF employs an occupant traffic model f to generate a predicted or model-based occupancy estimate based on a current or present occupancy estimate.

The EKF may make use of either the single-phase occupant traffic model or the kinetic motion (KM)-based occupant traffic model. The single-phase occupant traffic model will be discussed first, including how the single-phase occupant traffic model is incorporated by occupancy estimation algorithm 20 to generate occupancy estimates $\hat{x}$. The KM-based occupant traffic model is discussed with respect o FIGS. 5A-6B.

In an exemplary embodiment, the general equation for the Extended Kalman Filter (based either on the single-phase model or the KM-based model) occupancy estimate is defined by the following equation:

$$x(t+1)=f(t,x(t))+v(t) \quad \text{Equation 1}$$

where x(t) represents occupancy in a region (e.g. in each zone in the example shown in FIGS. 1A and 1B) at time t, f(e.g., the single-phase occupant traffic model) is some non-linear function of time t and states x(t), and v(t) is process noise, representing the uncertainty in how occupants move in a region. The structure of the non-linear function $f$ is dependent on the region. Thus, in the example related to occupancy estimates in a building, the exact form of function $f$ will vary depending on the layout of the building (among other factors). In addition, because the structure of f describes the expected traffic patterns of occupants within the region, the form of function $f$ may also vary based on the 'mode' of the region. Mode defines the operating state of the region. For instance, during a fire or similar emergency, a building will be in an egress mode (i.e., evacuation mode) in which all occupants are modeled to move towards available exits. Other modes may be dictated by the time of day (e.g., building modes for morning activity versus building mode for afternoon activity) or other factors.

For the sake of simplicity, the following example assumes an egress mode, described with examples based on the floor plan illustrated in FIGS. 1A and 1B. Therefore, the following equation describes the single-phase occupant traffic model f for a region (e.g., zone of the floor plan shown in FIGS. 1A and 1B):

$$x_1(t+1)=x_1(t)+y_{21}(t)+y_{31}(t)-y_{16}(t) \quad \text{Equation 2}$$

wherein $x_1(t+1)$ represents the state (e.g., number of occupants) in zone 1 at time t+1, $x_1(t)$ represents the previous state of occupants in zone 1 at time t, $y_{21}(t)$ represents the number of occupants moving from zone 2 to zone 1 at time t, $y_{31}(t)$ represents the number of occupants moving from zone 3 to zone 1 at time t, and $y_{61}(t)$ represents the number of occupants moving (exiting) from zone 1 via exit 6 at time t. The model would vary for non-egress modes in which occupants are not instructed to move towards exits. For example, movement of occupants would not be confined to movements from zone 2 to zone 1, but would also include movement from zone 1 to zone 2. The structure of occupant traffic model f is therefore dependent, in part, on the layout of the building and may vary from region to region. In an exemplary embodiment based on the above example, the function relating the flow of occupants from zone 1 to exit 6 is modeled as:

$$y_{16}(t)=\min[x_1(t),\alpha^*C_{16}] \quad \text{Equation 3}$$

In this equation, $C_{16}$ represents the flow capacity of the link from zone 1 to exit 6, and is selected based on physical characteristics of the passage from zone 1 to exit 6. The parameter $\alpha$ is a tuning parameter that is specific to a particular design.

In an embodiment based on this example, the function relating the flow of occupants from zone 2 to zone 1 is modeled as:

$$y_{21}(t)=\min[\alpha_{21}x_2(t)^*\beta/C_2^*(C_1-x_1(t))/C_1,C_{21}] \quad \text{Equation 4}$$

In this equation, $\alpha_{21}$ is the percent of occupants in zone 2 who have the exit in zone 1 as the nearest exit, the term $\beta/C_2$ represents the delay for occupants moving across zone 2, $C_2$ is the maximum occupancy of zone 2 (i.e., $C_2$ is proportional to the area corresponding to zone 2), the term $(C_1-x_1(t))/C_1$ represents congestion in zone 1 that slows occupants from moving into the zone, $C_{21}$ is the link capacity from zone 2 to 1, and finally $\beta$ is a tuning parameter. The flow between zone 3 and zone 1 would be modeled in the same manner used to model flow between zone 2 and zone 1. In this way, the single-phase occupant traffic model f makes predictions regarding the occupancy in a particular zone based on current information regarding occupancy in each of the zones. In other embodiments, additional modeling parameters may be employed to model additional aspects of movement through the region.

The second component of the equation used to calculate a model-based occupancy estimate (i.e., equation 1) is the process noise represented by the term v(t). The process noise term v(t) accounts for the uncertainty in how occupants move between zones. A straightforward and simplistic approach for modeling the process noise v(t) is to assume that the process noise v(t) in Equation 1 is zero-mean and Gaussian with variance proportional to state x(t) and independent among zones. In an embodiment employing the Extended Kalman Filter, the covariance matrix for the process noise is set equal to a diagonal matrix with elements corresponding to the state variance of the current estimate.

In an exemplary embodiment the occupancy estimation algorithm (e.g., an Extended Kalman Filter) also makes use of a sensor model h, described by the following equation:

$$z(t) = h(t, x(t)) + w(t) \quad \text{Equation 5}$$

wherein output vector z(t) represents an occupancy measurement in each of the five zones at time t, function h is the sensor model and is a function of time t and occupant estimate x(t), and w(t) is sensor noise. For example, in the embodiment shown in FIGS. 1A and 1B, a sensor device is located on each border between adjacent zones, and at each exit. In an exemplary embodiment, the resulting sensor model (relevant to zone 1) for the example shown in FIGS. 1A and 1B is expressed as:

$$z_1(t) = z_1(t-1) + \phi_{21}(t) + \phi_{31}(t) - \phi_{16} \quad \text{Equation 6}$$

wherein $z_1(t-1)$ represents the previous measurement (based on sensor input) of occupants in zone 1, $\phi_{21}(t)$ represents sensor outputs indicating occupant movement from zone 2 to zone 1, $\phi_{31}(t)$ represents sensor outputs indicating occupant movement from zone 3 to zone 1, and $\phi_{16}(t)$ represents sensor outputs indicating occupant movement from zone 1 to exit 6. The sensor readings provided by individual sensor devices can be in error, and $z_1(t)$ defined in Equation 6 may therefore accumulate errors over time based on errors in individual sensor readings. However, in an embodiment in which the extended Kalman filter is employed, the sensor noise w(t) is modeled as zero mean and white, with variance equal to the variance of the estimate of the sensor-only estimator (i.e., if the occupant estimate was based only on sensor input and not on the occupant traffic model). In an exemplary embodiment, the sensor data z(t) is analyzed by applying sensor model h to outputs provided by individual sensor devices (e.g., $\phi_{21}(\phi)$. In another exemplary embodiment, pre-processing is performed on the sensor data z(t) such that the sensor data provided to occupancy estimation algorithm 20 reflects occupancy estimates of zones based on received sensor data (as described in more detail with respect to FIGS. 3A and 3B).

Figure 3A:
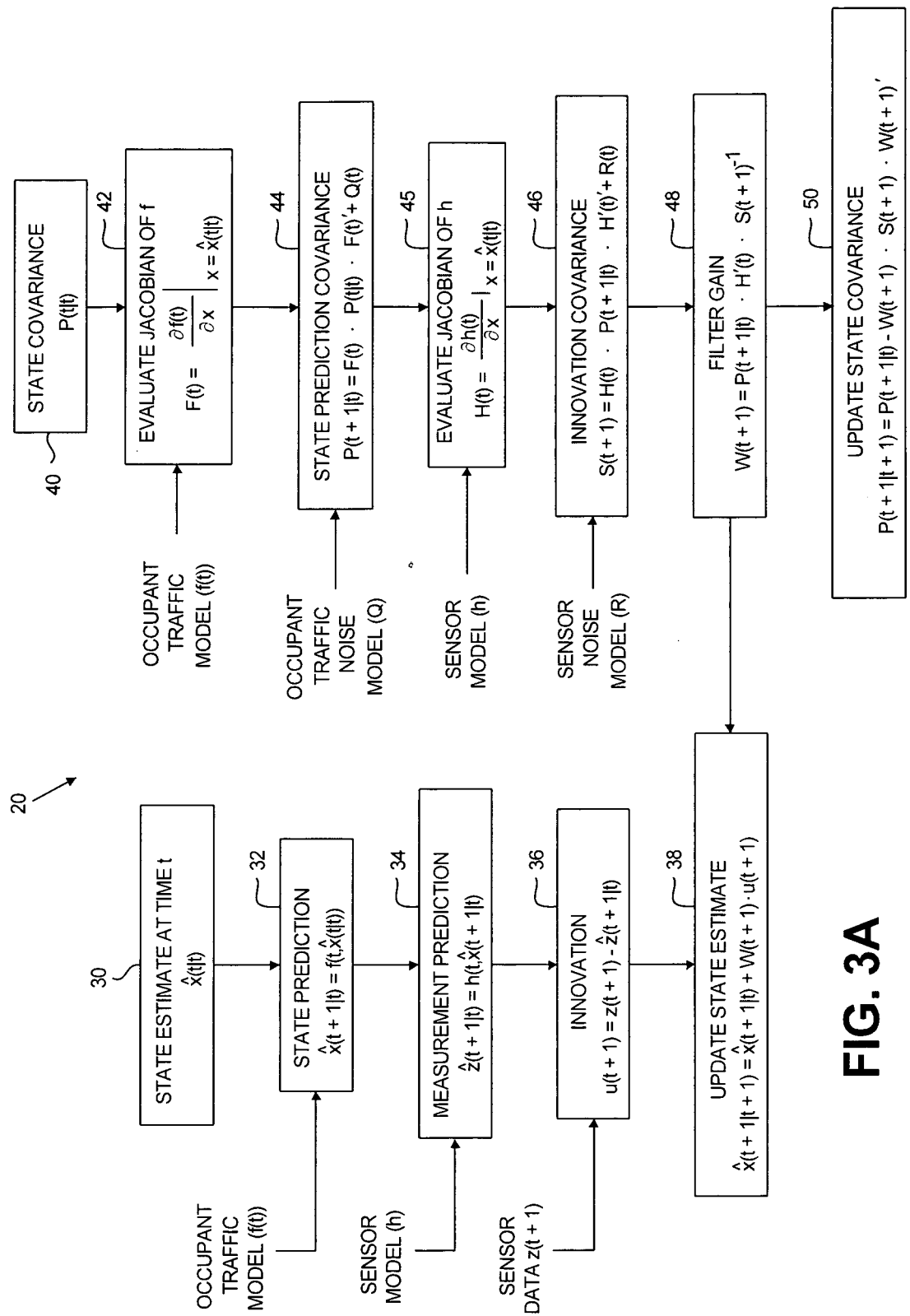
FIGS. 3A and 3B are flowcharts illustrating exemplary embodiments of an extended Kalman filter algorithm employed to calculate occupancy estimates.
Figure 3B:
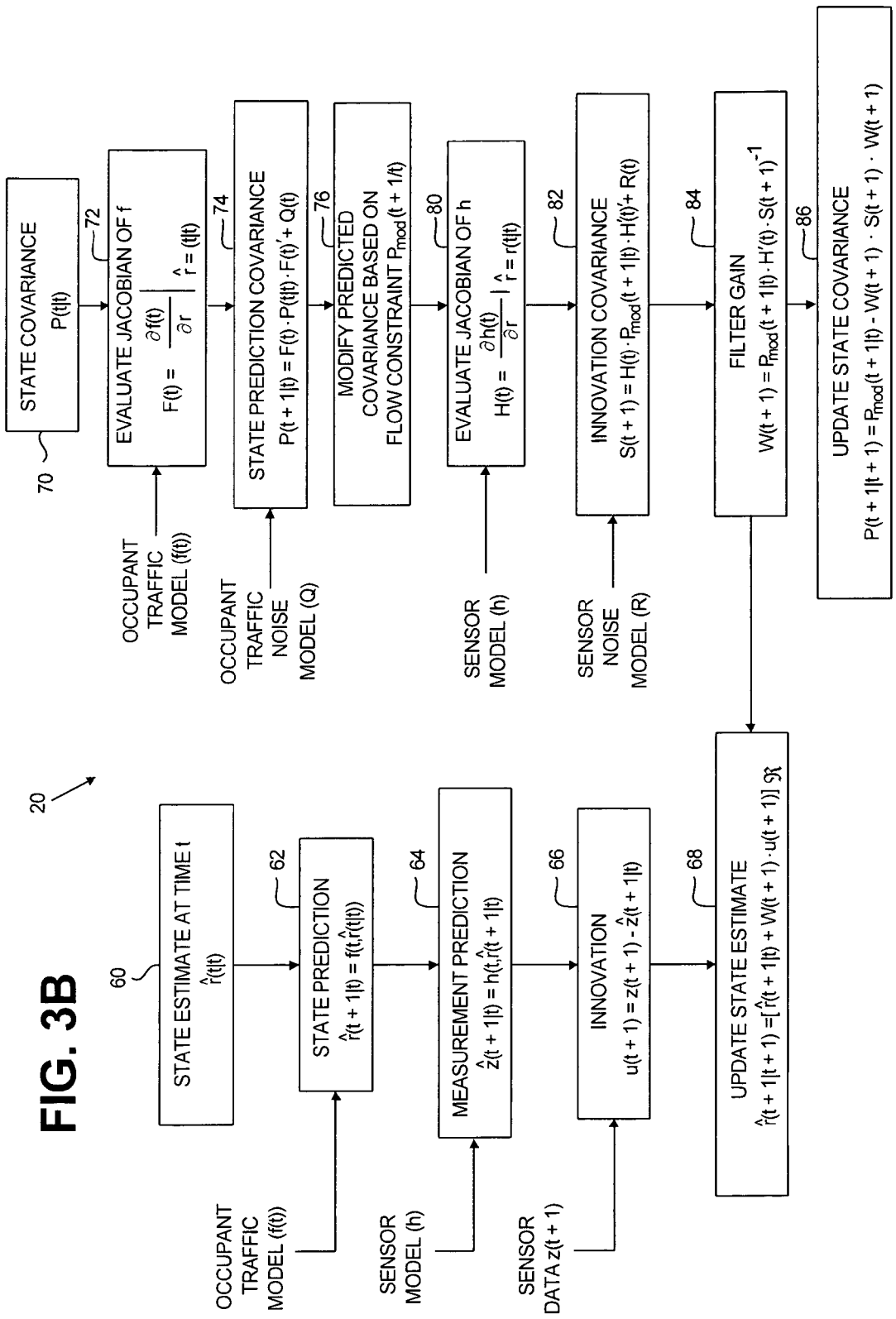

FIGS. 3A and 3B are flowcharts, each illustrating an exemplary embodiment of how occupancy estimation algorithm 20 operates to combine sensor data z(t), sensor model h, and occupant traffic model f(t) to generate occupancy estimates. Both embodiments employ an Extended Kalman Filter, in which model-based estimates or state predictions are corrected with sensor data to provide an output (referred to as a state estimate) that utilizes both the occupant traffic model and the sensor data. The main difference between the embodiment shown in FIG. 3A and the embodiment shown in FIG. 3B is in the treatment of state variables. In FIG. 3A, only the occupancy estimate $\hat{x}(t|t)$ (i.e., the estimate of the number of people in a particular region) is treated as a state variable. As a result, only the occupancy estimate $\hat{x}(t|t)$ is corrected with sensor data. In the embodiment shown in FIG. 3B, both the occupancy estimate $\hat{x}(t|t)$ and the flow of occupants $\hat{y}(t|t)$ between adjacent regions are included as state variables, meaning that both are corrected by the available sensor data z(t). In addition, the embodiment shown in FIG. 3B describes how constraints may also be incorporated into the calculation of state estimates (regardless of whether both the occupancy and flow are defined as state variables).

With respect to FIG. 3A, the left side of the flowchart illustrates the algorithm steps employed to update the state estimate of occupancy $\hat{y}(t|t)$, while the right side of FIG. 3A illustrates the algorithm employed to generate a covariance estimate P(t|t). The covariance estimate P(t|t) is a measure of the uncertainty associated with the occupancy estimate $\hat{x}(t|t)$. In the exemplary embodiment shown in FIG. 3A, both the sensor data z(t) and the occupancy estimate $\hat{x}(t|t)$ are vectors quantities, although in other exemplary embodiments one or both may be scalar quantities.

In this embodiment, calculating or updating of the occupancy estimate $\hat{x}(t+1|t+1)$ begins with a current occupancy estimate (generated in a previous iteration by the Extended Kalman Filter algorithm or by some initialization procedure) $\hat{x}(t|t)$, as shown at step 30. The notation of the occupancy estimate $\hat{x}(t|t)$ denotes that this is the occupancy estimate for time t, based on observations from time t (i.e., combination of both model outputs and sensor updates). At step 32, occupant traffic model f(t) is applied to the current occupancy estimate $\hat{x}(t|t)$ to generate occupancy prediction or model-based occupancy estimate $\hat{x}(t+1|t)$. That is, the occupancy in the next state is predicted based on the current state estimate and the occupant traffic model f(t). The notation $\hat{x}(t+1|t)$ denotes that this is the state prediction for time t+1 based on observations made at time t (i.e., the update is not based on the most recently observed events). At step 34, sensor model h is applied to model-based occupancy estimate $\hat{x}(t+1|t)$ to generate measurement prediction $\hat{z}(t+1|t)$. Measurement prediction $\hat{z}(t+1|t)$ represents the expected sensor measurements based on the model-based occupancy prediction $\hat{x}(t+1|t)$. For instance, if model-based occupancy prediction $\hat{x}_1(t+1|1)$ predicts the addition of an occupant to zone 1 (in this case, from zone 2), then measurement prediction $z_{21}(t+1|t)$ will indicate a predicted sensor measurement or observation of one occupant detected entering zone 1 from zone 2.

At step 36, measurement prediction $\hat{z}(t+1|t)$ is compared with actual sensor data z(t+1) to generate a difference signal represented by the innovation variable u(t+1). In this embodiment, sensor data z(t+1) has been pre-processed to provide values representing detected occupants moving between zones. In other embodiments, sensor model h or some other function would need to be applied to incoming sensor data in order to interpret the data such that z(t+1) represents detected occupant movement between zones. Based on the comparison between sensor data z(t+1) and measurement prediction $\hat{z}(t+1|t)$, innovation u(t+1) is determined. In an exemplary embodiment, innovation u(t+1) indicates the difference between expected sensor outputs (calculated at step 34) and the actual observed sensor outputs. For instance, using the example described above, model-based occupancy estimate $x_1(t+1|t)$ predicts one occupant enters zone 1 from zone 2, resulting in a corresponding measurement prediction of $z_{21}(t+1|t)$ being equal to one. If sensor data $z_{21}(t+1)$ instead equals zero, then innovation $u_{21}(t+1)$ will indicate the difference or error between the predicted value and the actual sensor value, in this case, an error of one.

At step 38, the occupancy estimate $\hat{x}(t|t)$ is updated based on occupancy prediction $\hat{x}(t+1|t)$, innovation u(t+1) and a weighting coefficient W(t+1) discussed in more detail with respect to the covariance calculations. As indicated by this equation, the updated occupancy estimate $\hat{x}(t+1|t+1)$ is based on both the model-based occupancy estimate $\hat{x}(t+1|t)$ generated based on the occupant traffic model f(t) and the observed sensor data z(t+1). The updated state estimate $\hat{x}(t+1|t+1)$ becomes the current state estimate $\hat{x}(t|t)$ in the next iteration. A benefit of generating the state estimate as a result of both the occupant traffic model f(t) and sensor data z(t+1), is the ability to generate a state estimate indicating occupancy despite a loss of sensor data. In this scenario, the error between the predicted measurement $\hat{z}(t+1|t)$ and sensor data $z(t+1)$ will increase, but an estimate of occupancy $\hat{x}(t+1|t+1)$ may still be generated based on partial sensor data $z(t+1)$ and the occupant traffic model $f(t)$, or based entirely on the occupant traffic model $f(t)$ if no sensor data is available.

In the embodiment shown in FIG. 3A, the covariance estimate $P(t|t)$ is generated as an output along with the state estimate $\hat{x}(t|t)$. Whereas the state estimate $\hat{x}(t|t)$ indicates the best guess or estimate of occupancy, the covariance indicates the level of confidence associated with the occupancy estimate. The state estimate $\hat{x}(t|t)$ and covariance $P(t|t)$ together define the probability distribution function (PDF) that can be used to describe both the state estimate and confidence associated with the estimate. As discussed above, the term occupancy estimate refers broadly not only to estimates regarding the actual number of occupants in a region, but also to data such as the covariance estimates $P(t|t)$ that are calculated in conjunction with actual number of occupant estimates (e.g., $\hat{x}(t|t)$).

Calculating or updating of the covariance estimate $P(t+1|t+1)$ begins with a current estimate of the covariance $P(t|t)$, as shown at step 40. At step 42, the occupant traffic model $f(t)$ is evaluated based on previous occupancy estimates to generate a Jacobian matrix depicted as $F(t)$. At step 44, the Jacobian matrix $F(t)$, initial covariance estimate $P(t|t)$, and uncertainty value $Q(t)$ associated with the occupant traffic model are used to generate a predicted covariance $P(t+1|t)$. At step 45, the sensor model $h(t)$ is evaluated based on previous estimates to generate a Jacobian matrix depicted as $H(t)$. At step 46, the Jacobian evaluation $H(t)$ and uncertainty $R(t)$ associated with the sensor model are applied to the predicted covariance $P(t+1|t)$ to generate the innovation covariance $S(t+1)$. At step 48, the inverse of the innovation covariance $S(t+1)^{-1}$ is used to generate weighting parameter $W(t+1)$, which represents the weighting that is applied to the sensor data at step 38.

The weighting parameter $W(t+1)$, as shown by the covariance calculation, weights the confidence level to be applied to the sensor data based on both the sensor models and the occupant traffic models, such that the updated state estimate $\hat{x}(t+1|t+1)$ reflects the determination of which input is most reliable. That is, if the confidence level associated with the sensor data $z(t)$ is high (or confidence in the model-based occupancy estimate $\hat{x}(t+1|t)$ is low), then filter gain value $W(t+1)$ as applied to the innovation $u(t+1)$ at step 38 results in the occupancy estimate providing more weight to the sensor data $z(t)$ than the result of the occupancy prediction $\hat{x}(t+1|1)$ generated by occupant traffic model $f(t)$. Likewise, if the filter gain value $W(t+1)$ indicates a low confidence associated with the sensor data $z(t+1)$ (or confidence in the model-based occupancy estimate is high), then the updated state estimate will be more heavily influenced by the result of the model-based occupancy estimate $\hat{x}(t+1|t)$ and less by the associated sensor data $z(t)$. For instance, in a situation in which sensors are compromised by smoke or fire, then the associated confidence of their outputs is decreased such that occupancy estimates are more heavily influenced by the result of applying occupant traffic model $f(t)$ to the state estimate $\hat{x}(t|t)$.

The weighting of sensor data $z(t)$ may also account for the reliability associated with the type of sensor devices used to provide sensor data $z(t)$. Some sensors are inherently more reliable than others, while others may be reliable in some instances and unreliable in others. The sensor model h, similar to the way in which occupant traffic model f accounts for the layout of a building, can be used to account for variations in types of sensor devices. For instance, a motion detection sensor device may be used to detect whether a room is occupied or not, but does not provide information regarding the number of occupants in a room (i.e., binary output). In this situation, data from the motion detection sensor indicating a room is not occupied (i.e., sensor data for a particular room $z_{room}(t+1)=0$) may be considered highly reliable. However, data from the motion detection sensor indicating a room is occupied (i.e., sensor data for a particular room $z_{room}(t+1)=1$) may be considered less reliable because the data does not account for the possibility that additional occupants may be present in the room. In one embodiment, the sensor model h accounts for the sensor type, and assigns an expected number of occupants located in the room based on size of the room (or some other variable). In addition, the reliability associated with data provided by a particular sensor device may be selectively modified based on the type of sensor device as well as the input received from the sensor device.

At step 50, the state covariance $P(t|t)$ is updated based on the filter gain value $W(t+1)$, the innovation covariance $S(t+1)$, and the predicted covariance $P(t+1|t)$ to generate an updated covariance value $P(t+1|t+1)$. This value reflects the confidence level in the occupancy estimate value $\hat{x}(t+1|t+1)$.

In the embodiment shown in FIG. 3A, the occupancy estimation algorithm 20 combines sensor data $z(t)$ and model-based occupancy estimates $\hat{x}(t+1|t)$ generated based on a previous occupancy estimate and a occupant traffic model $f(t)$. In particular, this method applies Extended Kalman Filter techniques to both the sensor data $z(t)$ and the occupant traffic model $f(t)$ to generate an occupancy estimation $\hat{x}(t+1|t+1)$ that takes into account the reliability of these inputs. The result is occupancy estimates $\hat{x}(t+1|t+1)$ that are highly reliable and covariance estimates $P(t+1|t+1)$ that provide an indication of associated reliability of provided occupancy estimates.

FIG. 3B is a flowchart illustrating another exemplary embodiment of how occupancy estimation algorithm 20 (as shown in FIG. 2) is implemented with an Extended Kalman Filter that combines sensor data $z(t)$, sensor model h, and occupant traffic model $f(t)$ to generate occupancy estimates. As discussed above, the term occupancy estimate is used broadly to describe the output of occupancy estimator filter 20, which in this exemplary embodiment includes a mean estimate (calculated on the left side of FIG. 3B and referred to as state variable $\hat{r}(t|t)$) and a covariance associated with each mean estimate (the covariance being calculated on the right side of FIG. 3B and referred to as $P(t|t)$). In contrast with the embodiment shown in FIG. 3A, in which only the occupancy estimate $\hat{x}(t|t)$ was employed as a state variable, this embodiment includes as state variables both the occupancy estimates $\hat{x}(t|t)$ and flow estimates $\hat{y}(t|t)$. The term $\hat{r}(t|t)$ expresses that both of these estimates are state variables, each being provided as an output of occupancy estimation algorithm 20.

$$\hat{r}(t|t) = \begin{bmatrix} \hat{x}(t|t) \\ \hat{y}(t|t) \end{bmatrix} \qquad \text{Equation 7}$$

The term $\hat{r}(t|t)$ will be referred to generally as the state estimate, but as illustrated in Equation 7 includes both the occupancy estimate $\hat{x}(t|t)$ reflecting the estimate of the number of people in a region at a time t and the occupant flow estimate $\hat{y}(t|t)$, which reflects the number of people flowing from one region to another region. For example, as illustrated in FIG. 1B, $\hat{y}_{21}/(t|t)$ describes the number of occupants moving from zone 2 to zone 1 at a given time step. This is in contrast with the embodiment shown in FIG. 3A, in which the number of occupants moving between adjacent regions was modeled by the occupant traffic model f(t), but not included as a state variable.

With respect to FIG. 3B, the left side of the flowchart once again illustrates the algorithm steps employed to update the state estimate r̂(t|t), while the right side of FIG. 3B illustrates the algorithm employed to generate a covariance estimate P(t|t). Once again, the covariance estimate generates a covariance value for each state variable, including both occupant estimates x̂(t|t) and flow estimates ŷ(t|t). The covariance estimate P(t|t) is a measure of the uncertainty associated with the state estimate r̂(t|t). Once again, a probability distribution function may be generated based on each state estimate and corresponding covariance. In the exemplary embodiment shown in FIG. 3B, both the sensor data z(t) and the state estimate r̂(t|t) are vectors (although for the sake of simplicity they have not been depicted as such), although in an exemplary embodiment one or both may be scalar quantities.

In general, the Extended Kalman Filter shown in FIG. 3B operates in the same manner as the Extended Kalman Filter shown in FIG. 3A. At step 62, a state prediction r̂(t+1|t) is generated by occupant traffic model f(t) based on a previous state estimate r̂(t|) (generated in a previous iteration by the Extended Kalman Filter algorithm or by some initialization procedure). Once again, the notation of the state estimate r̂(t|t) denotes that this is the state estimate for time t, based on observations from time t (i.e., combination of both model outputs and sensor updates). The notation r̂(t+1|t) denotes that this is the state prediction for time t+1 based on observations made at time t (i.e., the update is not based on the most recently observed sensor data).

At step 64, sensor model h is applied to model-based state estimate r̂(t+1|t) to generate measurement prediction ẑ(t+1|t). Measurement prediction ẑ(t+1|t) represents the expected sensor measurements based on the model-based state prediction r̂(t+1|t). This applies both to the number of occupants expected to be detected within a particular region as well as the number of occupants expected to be detected flowing from one zone to another. For instance, if model-based flow estimate prediction ŷ$_{21}$(t+1|1) predicts that one occupant flows from zone 2 to zone 1, then measurement prediction z$_{21}$(t+1|t) will indicate a predicted sensor measurement or observation of one occupant detected entering zone 1 from zone 2.

At step 66, measurement prediction ẑ(t+1|t) is compared with actual sensor data z(t+1) to generate a difference signal represented by the innovation variable u(t+1). Once again, innovation u(t+1) indicates the difference between expected sensor outputs (calculated at step 64) and the actual observed sensor outputs. For instance, using the example described above, model-based flow estimate ŷ$_{21}$(t+1|1) predicted one occupant entering zone 1 from zone 2, resulting in a corresponding measurement prediction of z$_{21}$(t+1|t) being equal to one. If sensor data z$_{21}$(t+1) instead equals zero, then innovation u$_{21}$(t+1) will indicate the difference or error between the predicted value and the actual sensor value, in this case, an error of one.

At step 68, the state estimate r̂(t|t) is updated based on state prediction r̂(t+1|t), innovation u(t+1), a weighting coefficient W(t+1) discussed in more detail with respect to the covariance calculations, and one or more constraints. This step is similar in form to step 38 illustrated in FIG. 3A, except that this step illustrates how the one or more constraints are employed to project the updated state estimate r̂(t+1|t+1) into allowed or feasible ranges. This step could also be employed in the embodiment shown in FIG. 3A, but is shown here to illustrate the differences between the two embodiments.

In general, the EKF is not designed to take into account constraints such as non-negative occupancy estimates, upper bounds on occupancy, and bounded rates associated with flow of occupants between adjacent regions. Such 'hard' constraints can be taken into account by defining for each state variable (e.g., x̂(t) or ŷ(t)) a projection of the state variable onto a convex region to which the state process is known to evolve, labeled $\Re$, as illustrated by the following equation.

$$[x]_R = \underset{y \in \mathcal{R}}{\mathrm{argmin}}\{(y-x)^T[P(t\mid t)]^{-1}(y-x)\} \qquad \text{Equation 8}$$

In particular, the is the projection of x̂ onto $\Re$ in the weighted Euclidean norm, in which the weighting matrix is specified by the inverse of the covariance matrix P(t|t).

The updated state estimate is then defined by the following equation.

$$\hat{x}(t+1\mid t+1)=[\hat{x}(t+1\mid t)+W(t+1)*u(t+1)]_\Re \qquad \text{Equation 9}$$

As shown, equation 8 is similar in form to the equation illustrated in step 38 of FIG. 3A, except that equation 8 projects the state variable into a feasible range defined by $\Re$. For additional details regarding the projection of state variables into allowed or feasible ranges, see "T.-L. Chia, *Parameter Identification and State Estimation of Constrained Systems*, Ph.D. thesis, Case Western Reserve University, Cleveland, Ohio 1985".

In an exemplary embodiment such as the embodiment shown in FIG. 3A, the updated state estimate r̂(t+1|t+1) becomes the current state estimate r̂(t|t) in the next iteration. However, in the embodiment shown in FIG. 3B, at step 69 the updated state estimate r̂(t+1|t+1) is further processed based on one or more constraints. For instance, constraints employed at this step may include the number of occupants modeled as physically capable of occupying a particular room or the number of occupants capable of flowing between adjacent rooms or regions in a particular time step. For instance, the number of occupants modeled as being present in a particular room should not be less than zero, but must be less than some large number (defined based on the size of the room). Based on one or more of these constraints, the state estimate generated at step 68 is projected into a range of possible outcomes. In this embodiment, the projected state estimate r̂$_{proj}$(t+1|t+1) would become the current state estimate r̂(t|t).

In this embodiment, the Extended Kalman Filter algorithm models the number of occupants located in each region x̂(t|t) as well as the number of occupants flowing between each region ŷ(t|t) and corrects each prediction with sensor data. A benefit of this system is the ability to generate estimates despite the loss of sensor data.

The covariance estimate P(t|t) is generated as an output along with the state estimate r̂(t|t) and indicates the level of confidence associated with the state estimate. The covariance estimate P(t|t) will therefore include terms related to both state variables, the occupancy estimates x̂(t|t) and flow rate estimates ŷ(t|t).

Calculating or updating of the covariance estimate P(t+1|t+1) begins with a current estimate of the covariance P(t|t), as shown at step 70. At step 72, the occupant traffic model f(t) is evaluated based on previous occupancy estimates to generate a Jacobian matrix depicted as F(t). At step 74, the Jacobian matrix F(t), initial covariance estimate P(t|t), and uncertainty value Q(t) associated with the occupant traffic model are used to generate a predicted covariance P(t+1|t).

In this embodiment, predicted covariance $P(t+1|t)$ has terms directed toward both the occupancy estimate for each region $\hat{x}(t|t)$ and the flow estimate of occupants between each region $\hat{y}(t|t)$. As described above, the flow of occupants between regions (in this example, between zones 2 and 1) is described by the following equation.

$$y_{21}(t)=\min[\alpha_{21}x_2(t)*\beta/C_2*(C_1-x_1(t))/C_1, C_{21}]$$  Equation 10

As shown, the function of the term min[a,b] is to select the minimum of the two terms calculated (i.e., the minimum value between term 'a' and term 'b'). The first term, $\alpha_{21}x_2(t) *\beta/C_2*(C_1-x_1(t))/C_1$ represents the expected flow of occupants between the region based on factors such as the expected percentage of occupants moving from zone 2 to zone 1 ($\alpha_{21}$), the number of occupants in zone 2 ($x_2(t)$), as well as congestion of occupants in zone 1 that may affect the flow of occupant from zone 2 to zone 1. The term $C_{21}$ is a flow constraint value that in this equation sets a maximum value for the number of occupants who can flow from zone 2 to zone 1 in a given timestep. Thus, if the left term of equation 8 exceeds the flow constraint value $C_{21}$, then equation 8 limits the expected flow estimate $y_{21}$ to equal the flow constraint value $C_{21}$.

In the embodiment shown in FIG. 3A occupant flow $\hat{y}(t|t)$ was not treated as a state variable, and therefore there was no opportunity to take advantage of the flow constraint in calculating the covariance associated with the occupancy estimate. In the embodiment shown in FIG. 3B, occupant flow is treated as a state variable, allowing the flow constraint term introduced in Equation 4 (and reproduced in Equation 10) to be used to improve the covariance calculations (i.e., reduce the uncertainty associated with state estimates $\hat{r}(t|t)$). At step 76 of the flowchart illustrated in FIG. 3B, the predicted covariance $P(t+1|t)$ is modified to take into account the flow constraint value.

Figure 4A:
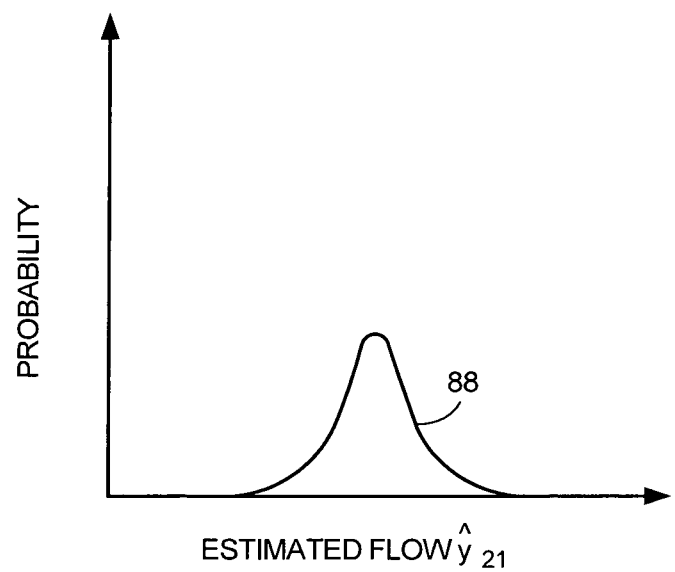
FIGS. 4A and 4B are graphs illustrating differences between embodiments in which a state variable associated with flow of occupants between regions is constrained.
Figure 4B:
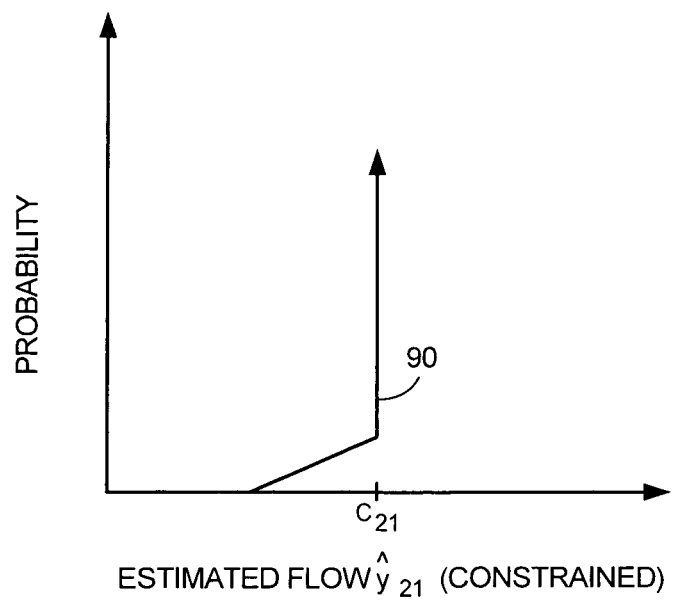

FIGS. 4A and 4B illustrate how the probability distribution function (PDF), which is generated based on the predicted mean estimate for a state variable and the covariance associated with the state variable, can be modified based on flow constraint values. FIG. 4A illustrates a PDF (illustrated by line 88) associated with estimated occupant flow $y_{21}$ without taking into account flow constraints. The unmodified PDF therefore allows with varying probabilities the possibility of many occupants moving from one zone to another at any given time. FIG. 4B illustrates a PDF (illustrated by line 90) associated with estimated occupant flow $y_{21}$ in which flow constraints are employed to modify the probabilities associated with flow estimates existing above the defined flow constraint threshold. Thus, all probabilities existing above the flow constraint threshold are consolidated onto the value representing the flow constraint threshold (e.g. $C_{21}$). For example, if the flow constraint threshold $C_{21}$ is equal to three occupants, then all probabilities associated with more than three occupants flowing between these zones are removed and consolidated onto the threshold value. As a result, the probability associated with the flow constraint threshold (e.g., $C_{21}$) is assigned a probability equaling the sum of probabilities existing above the threshold. This has the effect of reducing the uncertainty associated with flow estimates, and therefore improves the covariance $P(t|t)$ associated with the occupancy flow estimates $\hat{y}(t|t)$.

At step 80, the sensor model h(t) is evaluated based on previous estimates to generate a Jacobian matrix depicted as H(t). At step 82, the Jacobian evaluation H(t) and uncertainty R(t) associated with the sensor model are applied to the modified, predicted covariance $P_{mod}(t+1|t)$ to generate the innovation covariance $S(t+1)$. At step 84, the inverse of the innovation covariance $S(t+1)^{-1}$ is used to generate weighting parameter $W(t+1)$, which represents the weighting that is applied to the sensor data at step 68.

The weighting parameter $W(t+1)$, as shown by the covariance calculation, weights the confidence level to be applied to the sensor data based on both the sensor models and the occupant traffic models, such that the updated state estimate $\hat{r}(t+1|t+1)$ reflects the determination of which input is most reliable. That is, if the confidence level associated with the sensor data z(t) is high (or confidence in the model-based state estimate $\hat{r}(t+1|t)$ is low), then filter gain value $W(t+1)$ as applied to the innovation $u(t+1)$ at step 68 results in the updated state estimate $(t+1|t+1)$ providing more weight to the sensor data z(t) than the result of the state prediction $\hat{r}(t+1|1)$ generated by occupant traffic model f(t). Likewise, if the filter gain value $W(t+1)$ indicates a low confidence associated with the sensor data $z(t+1)$ (or confidence in the model-based occupancy estimate is high), then the updated state estimate $(t+1|t)$ will be more heavily influenced by the result of the model-based state estimate $\hat{r}(t+1|t)$ and less by the associated sensor data z(t). For instance, in a situation in which sensors are compromised by smoke or fire, then the associated confidence of their outputs is decreased such that occupancy estimates are more heavily influenced by the result of applying occupant traffic model f(t) to the previous state estimate $\hat{r}(t|t)$.

As discussed with respect to FIG. 3A, the weighting of sensor data z(t) may also take into account the reliability associated with the type of sensor devices used to provide sensor data z(t). This includes the method by which data provided by motion detection sensors is interpreted based on the input provided by the motion detection sensor (i.e., occupied or unoccupied). As discussed above, the relevancy of data provided by motion sensors depends on the state of the data provided by the motion sensor. Data indicating a room is not occupied (i.e., sensor data for a particular room $z_{room}(t+1)=0$) may be considered highly reliable. However, data from the motion detection sensor indicating a room is occupied (i.e., sensor data for a particular room $z_{room}(t+1)=1$) may be considered less reliable because the data does not account for the possibility that additional occupants may be present in the room. Thus, in situations in which a motion sensor detects that a room is occupied, the occupancy estimation algorithm 20 will interpret the data provided by the sensor as highly noisy, and thus unreliable. In situations in which a motion sensor detects that a room is unoccupied, occupancy estimation algorithm 20 models the data as highly reliable.

At step 86, the state covariance $P(t|t)$ is updated based on the filter gain value $W(t+1)$, the innovation covariance $S(t+1)$, and the modified predicted covariance $P_{mod}(t+1|t)$ to generate an updated covariance value $P(t+1|t+1)$. This value reflects the confidence level in the occupancy estimate value $\hat{r}(t+1|t+1)$.

Thus, the embodiment shown in FIG. 3B illustrates the way in which the occupancy estimation algorithm 20 combines sensor data z(t) and model-based estimates of occupancy $\hat{x}(t+1|t)$ and flow $\hat{y}(t+1|t)$ (collectively referred to in FIG. 3B as $\hat{r}(t+1|t)$) to generate mean estimates and covariances associated with state variables. In addition, this embodiment describes how constraints associated with the flow of occupants between adjacent zones can be used to improve the covariance estimates associated with the estimate of occupant flow $\hat{y}(t|t)$ (i.e., reduces the uncertainty associated with the estimate). FIG. 3B also describes how constraints (including, but not limited to flow constraints) can be used to project the state estimates (either related to occupancy, flow, or both) to allowed states. The several improvements described with respect to FIG. 3B may be employed alone or in conjunction with one another depending on the application.

FIGS. 3A and 3B illustrated an exemplary embodiment in which occupancy estimates (as well as occupant flow estimates) were generated based on a single-phase occupancy model and corrected by an Extended Kalman Filter. An alternative to the single-phase occupancy model is the Kinetic Motion (KM)-based model described with respect to FIG. 5A-7B. The KM-based model predicts the expected movement of occupants, but unlike the single-phase occupancy mode, provides a different approach to modeling congestion between regions. One of the benefits of employing the KM-based model is the ability to model occupant movement at a room level, because the KM-based model better accounts for how congestion will affect the flow of occupants between individual sites.

Figure 5A:
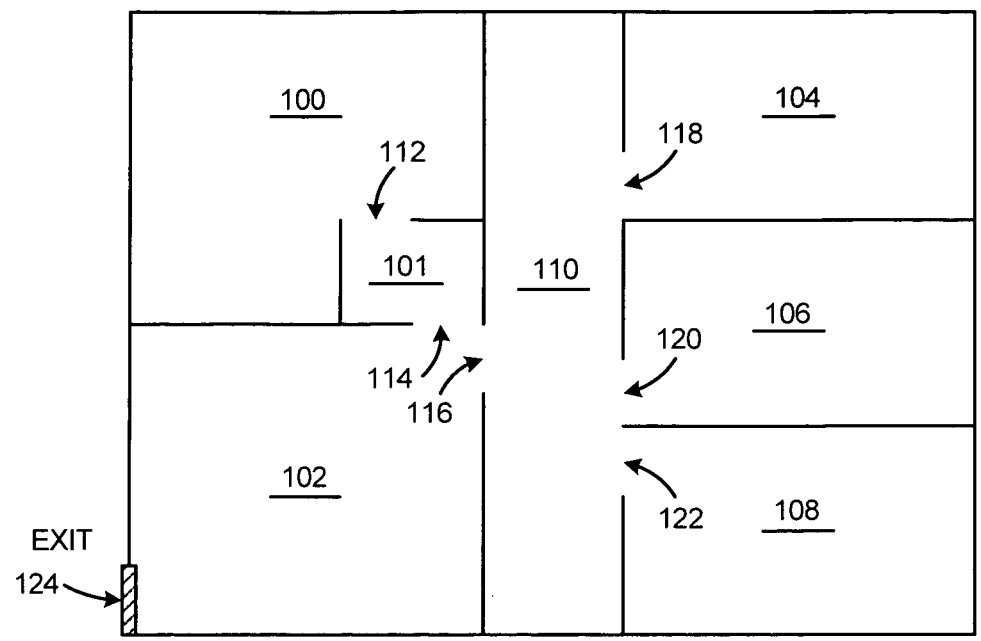
FIG. 5A is a schematic of a floor of a building.
Figure 5B:
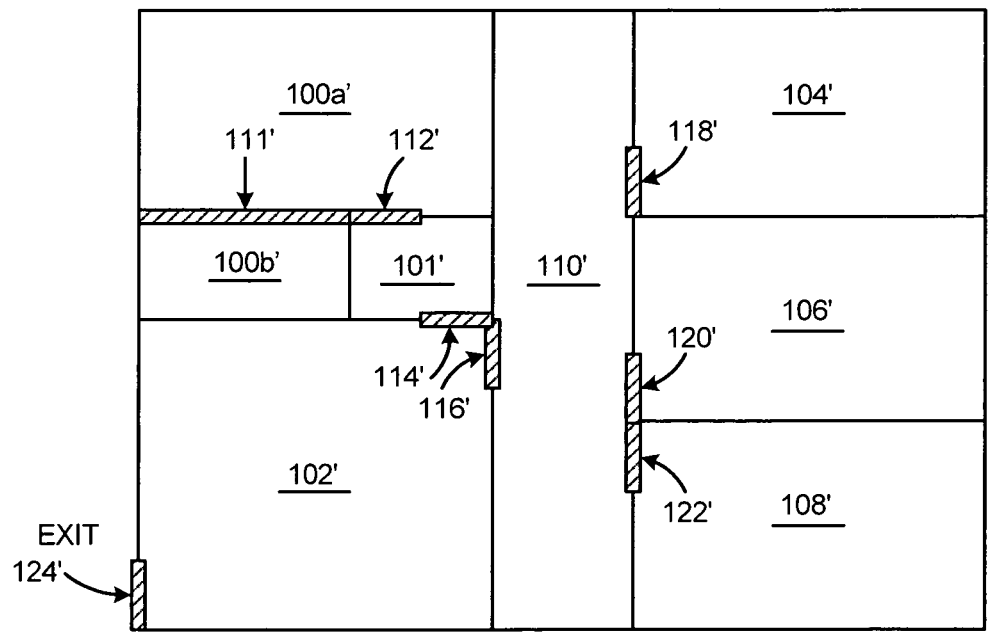
FIG. 5B is a diagram illustrating how the floor plan of the building is interpreted for analysis by the Kinetic Motion (KM)-based model.

FIG. 5A is a schematic of a portion of a building, and FIG. 5B is a diagram illustrating graphically how the schematic shown in FIG. 5A is interpreted for analysis by the KM-based model.

The floor plan shown in FIG. 5A includes rooms 100, 101, 102, 104, 106, 108, and 110, doors 112, 114, 116, 118, 120, and 122, and exit 124. To model the movement of occupants at the room or site level, a key factor in determining the flow of occupants between adjacent rooms is the geometry of the rooms as well as the widths of the doors connecting adjacent rooms. The geometry of the rooms, and in particular the distance between entrances and exits, is used to model the time it will take an occupant to traverse a segment. The width of the doors is also employed to model the rate at which occupants may exit a segment.

FIG. 5B illustrates an exemplary embodiment of how the floor plan shown in FIG. 5A may be modeled as a number of segments. FIG. 5B includes modeled segments 100a', 100b', 101', 102', 104', 106', 108' and 110', modeled doorways 111', 112', 114', 116', 118', 120' and 122', and modeled exit 124'. In this embodiment, all rooms are modeled as simple rectangular segments. For those rooms that are already rectangular in shape, the modeled segments share the same shape and dimensions. For rooms that are not rectangular in shape, the room can be modeled as a combination of two or more rectangular segments.

For instance, room 100 is non-rectangular in shape. This room is modeled in FIG. 5B as a combination of segments 100a' and 100b'. The 'doorway' between modeled segments 100a' and 100b' is modeled by doorway 111'. As shown in FIG. 5B, the width of the modeled doorway 111' is equal to the length of the opening between the modeled segments 100a' and 100b'. In this way, although a single room has been divided into two, the congestive effect caused by doorways is minimized in the model by the width of the doorway.

The remainder of the doorways are modeled in a similar fashion, with the location and width of the modeled doorways tracking closely with the physical location and widths of the real doorways. Modeling of the rooms also includes noting the distance between doorways. For instance, in this embodiment the model would note the distance between doorways 114' and the exit, to allow for the model to take into account the time it would take for an occupant to traverse room 102'.

Figure 6A:
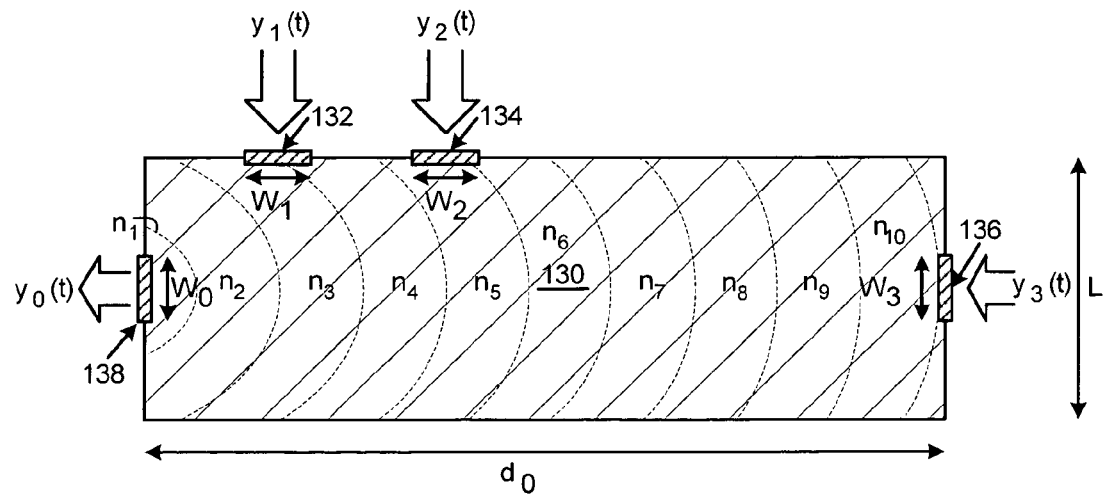
FIG. 6A is a diagram illustrating the modeling of occupants in a single room using the KM-based model.
Figure 6B:
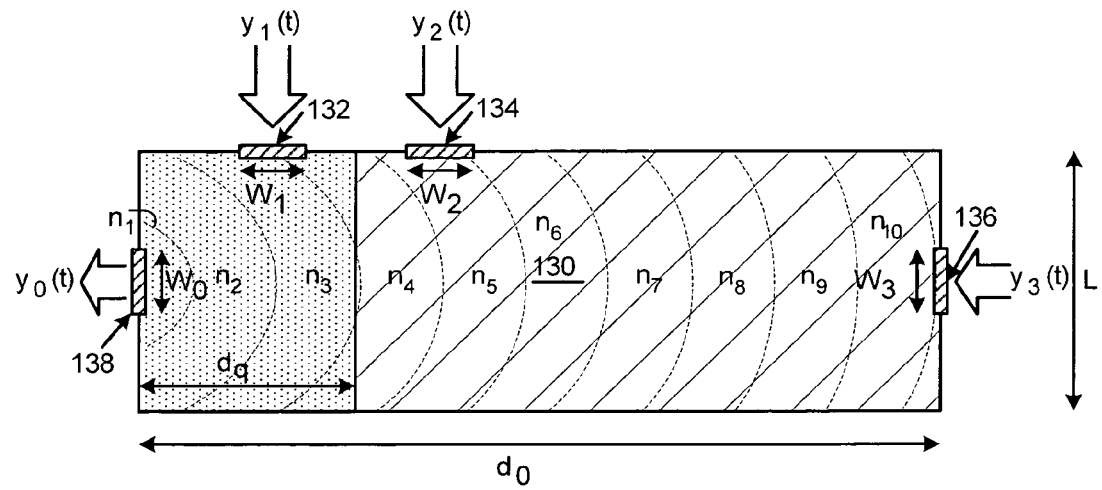
FIG. 6B is a diagram illustrating the modeling of occupants in a single room using the KM-based model, including the modeling of congestion within the room.

FIGS. 6A and 6B are diagrams illustrating how the KM-based model predicts the movement of occupants within a particular region. The same analysis used to describe the movement of occupants within this region would be applied to each room to predict the movement of occupants and overall occupancy levels in each room of a modeled building.

Both FIG. 6A and FIG. 6B illustrate a particular segment 130, which includes three entrances 132, 134 and 136, and exit 138. The geometry of segment 130 is defined by a length $d_0$ and a width L. Each entrance 132, 134 and 136 is defined by width $w_1$, $w_2$, and $w_3$, respectively, and exit 138 is defined by a width $w_0$. The distance between each entrance (132, 134, and 136) and exist 138 is defined by the distances $d_1$, $d_2$, and $d_3$, respectively.

FIG. 6A illustrates segment 130 in an uncongested state, while FIG. 6B illustrates segment 130 in a partially congested state. The congested state shown in FIG. 6B is characterized as a queue, in which occupants approaching the congested state are added to the queue. As occupants are added to the queue, the length of the queue is increased as defined by the following equation.

$$d_q = \frac{q * A}{L} \qquad \text{Equation 11}$$

The term A represents the area occupied, on average, by a single occupant. The term q defines the number of people currently within the queue, and the term L (as defined above) corresponds with the width of segment 130. Thus, as people are added to the queue, the queue length $d_q$ or congested area is extended farther into segment 130. Conversely, when occupants exit via exit 138 the length of the queue $d_q$ would decrease.

Segment 130 is further sub-divided into a plurality of elementary cells as indicated by the plurality of circular lines surrounding exit 138. Because of the length of segment 130, the elementary cells could also be defined as rectangles spanning the width L of segment 130. The number of occupants located in each elementary cell is expressed as $n_1, n_2, n_3 \ldots n_m$ wherein there are m elementary cells. The number of occupants located in the uncongested portion of segment 130 is expressed as the sum of occupants located in each cell.

$$n_{tot} = \sum_{i=\tau_q}^{m} n_i \qquad \text{Equation 12}$$

The term $\tau_q$ represents the first elementary cell not modeled as part of the queue. Thus, Equation 12 defines the number of occupants in the uncongested portion of segment 130. The total number of occupants $\hat{x}(t)$ located in a segment could therefore be expressed as a sum of the total number of occupant in the queue, defined as q, and the number of occupants located in the uncongested portion $n_{tot}$.

$$\hat{x}_i(t) = q_i + n_{tot} \qquad \text{Equation 13}$$

The time it takes for an occupant to travel from an entrance to the exit is defined by the following equation, $$\tau_i = d_i/V_0 \qquad \text{Equation 14}$$

wherein $d_i$ is the distance from a particular entrance to the exit, and $V_0$ is the velocity at which occupants are expected to travel. The width of each elementary cell is defined such that an occupant can be modeled as advancing one elementary cell closer to the exit at each time step, assuming the occupant is moving through an uncongested region. Therefore, as shown in FIG. 6A, if an occupant enters through entrance 132, and is therefore associated with the elementary cell $n_3$, at the next time step the occupant will be modeled as having entered elementary cell $n_2$. In the next time step, the occupant will be modeled as having entered elementary cell $n_i$. The occupant can therefore be expected to reach exit 138 approximately three time steps after entering segment 130 through entrance 132.

Thus, the number of occupants in each elementary cell can be modeled by the following equation.

$$n_i(k+1) = n_{i+1}(k) + \sum_i y_i(k) \qquad \text{Equation 15}$$

The number of occupants located in a particular cell i at time k+1 is equal to the sum of the number of occupants located in the adjacent cell in the previous time step k and the number of occupants modeled to enter cell i by way of an entrance into segment 130. Equation 15 therefore models the movement of occupants within uncongested regions of segment 130.

The queue is maintained by the following equation.

$$q(k+1) = q(k) + n_{\tau_q} - y_0(k) \qquad \text{Equation 16}$$

The number of occupants in queue at time k+1 is equal to the sum of the number of occupants in the queue at the previous time step k and the number of occupants located in the elementary cell located at the end of the queue $n_{\tau_q}$, less the number of occupants that leave the queue via exist 138. Upon reaching the queue, occupants are no longer modeled as moving through elementary cells at each time step. Rather, the congested area is modeled as a queue, in which the length of the queue (as defined in Equation 11) is based solely on the number of occupants in the queue, and the number of occupants in the queue is modeled based on the number of occupants entering the queue and exiting the queue.

Equations 11-16 define the movement of occupants through a segment. In particular, these equations distinguish between congested and uncongested regions. As discussed in more detail below, this distinction determines how occupants are modeled to flow into and out of the segment.

In an exemplary embodiment the KM-based model operates as a stand-alone tool that does not require correction of occupancy estimates based on sensor data. For example, employing the KM-based model without the benefit of sensor data may be particularly practical in applications such as egress-modeling in which occupants can be expected to move towards exits. In this embodiment, the occupancy estimates would be based solely on the equations described above with respect to the KM-based model. The initial state (e.g., initial occupancy estimates) to which the KM-based model would be applied (for instance, upon the issuance of a fire alarm signifying an egress mode of operation) may be modeled based on statistical occupancy data, simulated occupancy data or stored data regarding the location of occupants. For instance, statistical data may include defining initial occupant locations based on assignment of a simple distribution describing the likely location of occupants (e.g., Gaussian distribution). Simulated occupancy data may be based on historical or observed data regarding the likely location of occupants (e.g., a classroom may be modeled as containing a particular number of occupants depending on time of day). In addition, any other stored data such as knowledge regarding scheduled meeting times may be used to initialize the initial occupancy state. The KM-based filter is then employed to generate occupancy estimates that model occupant movement, taking into account modeled congestion during the operation.

In another exemplary embodiment, the KM-based model is used in conjunction with sensor data to generate corrected estimates of occupancy. As with the single-phase model described above, the goal of the KM-based model is to generate predictions regarding how many occupants are located in a particular segment at a given time. In the single-phase model this was based on the number of occupants previously located in a region, the number of occupants entering the region, and the number of occupants exiting a region. Thus, the relevant state variable was the number of occupants in a particular region and, in some embodiments, the number of occupants flowing between regions. In the KM-based model, there are several ways of organizing the model for use in conjunction with a filter (e.g., the extended Kalman filter described with respect to FIGS. 3A and 3B).

In one embodiment, state variables are defined with respect to number of occupants located in each elementary cell (e.g., see Equation 15), the number of occupants in the queue (e.g., see Equation 16), and the flow of occupants between adjacent rooms. These state variables would be corrected with sensor data as described with respect to FIGS. 3A and 3B to generate state estimates and associated covariances. In embodiments in which it is desirable to generate estimates for a particular zone or region, the state estimates regarding number of occupants in a queue, as well as the number of occupants in each elementary cell could be combined as described in Equation 13 to generate an estimate regarding the number of total occupants in a room or region.

In another exemplary embodiment, state variables are defined with respect to the state of the queue (i.e., number of occupants in the queue), the total number of occupants in the uncongested portions of each segment, and the flow of occupants between adjacent regions. Once again, estimates for the total number of occupants in a particular segment or region can be derived based on these state variables.

In both embodiments, modeling of the flow of occupants is dependent on the state (i.e., congestion) of each segment. In particular, modeling the flow of occupants into a particular segment is dependent, in part, on the whether the entrance to the segment is modeled as congested or uncongested. The entrance to a segment can be categorized into one of three states. In an exemplary embodiment, the effect of congestion in a particular segment, and the effect it has on doors acting as an entrance to the segment are modeled by the following flags.

$$f_i = \begin{cases} 0, & x_q < x_i \\ 1, & x_q > x_i \\ 2, & n_{tot} + q = S_0 \end{cases} \qquad \text{Equation 17}$$

Therefore, a flag is set to '0' in cases in which an entrance opens to an uncongested area, to '1' in cases in which an entrance opens to a congested area, and '2' in cases in which all entrances to a particular segment open to congested areas (i.e., the segment is totally congested). For example, in FIG. 6A, all entrances 132, 134 and 136 would be assigned to the state $f_i=0$ because all open to uncongested regions. In FIG. 6B, entrance 132 would be assigned the flag $f_1=1$, because the queue is identified as extending beyond the location of entrance 132. Entrances 134 and 136 would be assigned to the flags $f_2, f_3=0$, because each opens to an uncongested portion of segment 130. In the situation in which an entire segment is identified as congested, then each entrance is assigned a flag $f_i=2$. The flags associated with each entrance determine how the flow of occupants into a segment is modeled, as illustrated by the following equation.

$$y_i(t) = \begin{cases} V_0 w_i \left(1 - \frac{n_i(t+\tau_i)}{L}\right)\left(\chi(q_i(t) - w_i V_0) + \frac{q_i(t)}{w_i V_0}(1 - \chi(q_i - w_i V_0))\right), f_i = 0 \\ P_i V_0 w_i \left(\chi(q_i(t) - P_i w_0 V_0) + \frac{q_i(t)}{P_i w_0 V_0}(1 - \chi(q_i(t) - P_i w_i V_0))\right), f_i = 1 \\ 0, f_i = 2 \end{cases} \quad \text{Eq. 18}$$

For conditions in which the entrance opens to an uncongested or low-density region, as indicated by the flag for that entrance being set to zero, the first line is applied in modeling how many occupants flow into the segment. The term '$V_0$' describes the velocity with which occupants are expected to move and $w_i$ models the width of the entrance through which the occupant is trying to pass. The velocity of occupants is defined as a constant value for all occupants. Therefore, for greater door widths, the number of occupants modeled as flowing through a particular door increases. The next term, $$\left(1 - \frac{n_i(t+\tau_i)}{L}\right)$$

represents how the density of agents in a particular elementary cell that an occupant is attempting to enter affects the possibility of enter. For instance, in FIG. 6B, if elementary cell $n_5$ is modeled as containing a number of occupants, then the density of occupants within that cell would be taken into account when determining how occupants flow through entrance 134. The greater the density of occupants in the elementary cell to be entered, the less probable it is an occupant will be allowed to enter through a particular entrance. The next term, $$(\chi(q_i(t) - w_i V_0) + \frac{q_i(t)}{w_i V_0}(1 - \chi(q_i - w_i V_0)))$$

describes how the flow of occupants through a particular entrance is defined, in part, on the size of the queue $q_i$ in the adjacent segment, as well as the width of the entrance $w_i$ and the assumed velocity of occupants $V_0$.

The second line of equation 18 models how occupants flow into segment 130 in situations in which the entrance opens to a congested area. For example, as shown in FIG. 6B, this equation would be employed to model the flow of occupants through entrance 132. The general form of this equation is nearly identical to the first line of the equation shown in equation 16, except for the addition of the term $P_k$, which represents the probability of an occupant being able to enter a segment based on the likelihood of vacancies propagating through the queue. Because the congested area (i.e., the queue) is modeled as a solid, occupants trying to enter a segment through a congested area can be modeled as filling vacancies that propagate through the solid when an occupant exits the queue. The vacancies are modeled as traveling instantly through the queue, such that the instant an occupant leaves the queue, a vacancy is propagated to allow a user from an adjacent segment to enter the congested area (i.e., the queue). The term $P_k$ is described by the following equation.

$$P_k = \left(\prod_{j=1}^{k-1} \left(1 - \frac{p_j}{L}\chi(d_q - d_j)\right)\right) * \frac{p_k}{L}\chi(d_q - d_j) \quad \text{Equation 19}$$

where $p_k = 1 - \left(\frac{1}{2}\right)^{w_k}$

The term represents a step function that returns a value of '0' when the term to which it is applied is less than zero, and returns a value of 1' when the term to which it is applied is greater than zero. The term $p_k$ defines the likelihood that a propagating vacancy passing by an entrance will enter (i.e., an occupant will be allowed to take the spot of the vacancy in the queue), and is dependent on the width of the door, with wider doors increasing the likelihood that a vacancy will enter. The term $$\prod_{j=1}^{k-1}\left(1 - \frac{p_j}{L}\chi(d_q - d_j)\right)$$

represents the likelihood of a vacancy reaching a particular entrance. Thus, the term $P_k$ defines the probability of a vacancy being propagated into a particular entrance, with the probability indicating that entrances closer to the exit will be more likely to capture propagating vacancies, and therefore increasing the odds of an occupant entering the segment. The probabilities defined with respect to equation 19 are used in conjunction with equation 18 to define how occupants enter a segment when the entrance is to a congested or high-density area.

The third term in equation 18 states that if the entire segment is modeled as congested, then no occupants will be modeled as entering the segment.

Based on the equations defined above and the modeling of occupants within a segment, the KM-based model provides accurate modeling of the flow of occupants into a particular segment. Output generated by the KM-based model would therefore include the number of occupants modeled to flow between each entrance and exit of each segment, as well as the number of occupants in each elementary cell or occupants in congested areas versus uncongested areas. Although based on different principles, both the KM-based model and the single-phase model provide an output that estimates the number of occupants in a particular region, as well as the flow of occupants between regions. In this way, the KM-based model may be employed as part of the Extended Kalman Filter described with respect to FIGS. 3A and 3B to provided state predictions. The EKF would then use received sensor data to correct the estimates provided by either the single-phase model or the KM-based model.

FIGS. 7A-7E illustrate the results of egress simulations run using the KM-based model as an input to the EKF. The simulation modeled nine video sensors to detect occupants moving between each of the zones shown in FIGS. 1A and 1B, as well as through each of the three exits. In addition, the simulation initializes occupancy in each room to equal 1.4 occupants on average, with the entire simulation lasting approximately 100 seconds. The simulated accuracy of the video cameras in detecting occupants moving between adjacent zones and through exits was modeled to be 98%. In addition, each room (96 in all) shown in FIGS. 1A and 1B was equipped with a motion sensor to detect whether the room was occupied or unoccupied at an estimated accuracy of 80%. The simulated sensor outputs were provided as inputs to the KM-based estimator.

Estimates regarding the number of occupants located in each zone were compared to the simulated actual movement of occupants between zones. The results for each zone are shown in FIGS. 7A-7E, respectively. The solid line represents the simulated actual count of occupants in each zone at different points in time, while the dashed line indicates the estimate generated by combining the model-based estimates generated by the KM-based model with the sensor data provided by the video sensors. As shown, the estimated occupancy in each zone closely follows the actual number of occupants located in each zone.

In addition, in order to quantify the improvements associated with an embodiment of the present invention, additional simulations were run in which estimates were generated based on different methods. The results were then compared to the simulation, described above, in which the KM-based model is employed in conjunction with the EKF and sensor data provided by nine video sensors and a plurality of motion detectors. In one simulation, estimates were generated based only on sensor data. In another simulation, estimates were generated based on sensor data from the video cameras (but not the motion detector sensors) and the Extended Kalman Filter with the KM-based model. The results of these estimates were compared with the simulation in which all sensor data (including motion sensor data) was employed, as well as the EKF employing the KM-based model.

Averaged over one-hundred simulations and for a variety of evacuation times, the following results were generated for each method.

TABLE 1

| | Mean Error Per Room |
|---|---|
| Sensor-only approach | 0.35 |
| EKF w/video camera (no motion detectors) | 0.14 |
| EKF w/both video cameras and motion detectors | 0.09 |

As shown, employing the EKF with the KM-based occupant model provided much improved results over the sensor-only approach. Employing the use of motion sensors, despite their limited reliability, further reduced the mean error per room. As a result, use of the Extended Kalman Filter, in which model-based estimates generated by the KM-based occupant model are combined with sensor data that include motion detector sensors, reduces the error associated with the sensor only approach by 74%. In addition, although motion sensors are more unreliable than other detection means, the use of motion detectors in each room had the effect of further reducing the mean error by an additional 36%.

Another benefit of the system described herein is the ability to perform the calculations in real-time. In all embodiments described herein, updates are provided every five seconds or less.

FIG. 8 illustrates an exemplary embodiment of a centralized system 152 for providing occupancy estimations for a region (e.g., each zone of the building as shown in FIGS. 1A and 1B or each room of the floorplan as shown in FIGS. 5A and 5B). Centralized system 152 includes computer or controller 154, computer readable medium 156, a plurality of sensor devices 158a, 158b, . . . 158N, and display or controller device 160. Sensor devices 158a-158N are distributed throughout a particular region, and may include a variety of different types of sensors, including video detectors, passive infra-red motion sensors, access control devices, elevator load measurements, IT-related techniques such as detection of computer keystrokes, as well as other related sensor devices. In addition, many occupants carry active devices, such as active or passive radio frequency identification (RFID) cards, cell phones, or other devices that can be detected to provide sensor data.

The sensor data is communicated to computer or controller 154. Depending on the type of sensors employed, and whether the sensors include any ability to process captured data, computer 154 may provide initial processing of the provided sensor data. For instance, video data captured by a video camera sensing device may require some video data analysis pre-processing to determine whether the video data shows occupants traversing from one zone to another zone. In addition, this processing performed by processor 154 may include storing the sensor data, indicating detected occupants moving between zones, to an array or vector such that it can be supplied as an input to the occupancy estimation algorithm (e.g., an Extended Kalman Filter).

In the embodiment shown in FIG. 8, computer 154 executes the steps of processes to generate the occupancy estimate. For instance, in an exemplary embodiment this may include performing the functions and operations described with respect to FIGS. 3A and 3B, as well as calculations associated with either the single-phase model or the KM-based model. Thus, the disclosed invention can be embodied in the form of computer or controller implemented processes and apparatuses for practicing those processes. The present invention can also be embodied in the form of computer program code containing instructions embodied in computer readable medium 156, such as floppy diskettes, CD-ROMs, hard drives, or any other computer-readable storage medium, wherein, when the computer program code is loaded into and executed by computer 154, the computer becomes an apparatus for practicing the invention. The present invention may also be embodied in the form of computer program code as a data signal, for example, whether stored in a storage medium 156, loaded into and/or executed by a computer or controller 154, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

For example, in an embodiment shown in FIG. 8, computer readable storage medium 156 may store program code or instructions describing the occupant traffic model f (either the single-phase model or the KM-based model), sensor model h, and an occupancy estimation algorithm (e.g., Extended Kalman Filter). The computer program code is communicated to computer or controller 154, which executes the program code to implement the processes and functions described with respect to the present invention (e.g., executing those functions described with respect to FIGS. 3A and 3B). In an exemplary embodiment, controller 154 relies solely an occupant traffic model (i.e., does not make use of sensor data) in generating occupancy estimates.

As shown in FIG. 8, computer or controller 154 generates an occupancy estimate that is provided to display or controller device 160. The occupancy estimate may include data including mean estimates of the number of occupants located in a region, probabilities associated with each possible occupancy level, changes in occupancy, data indicative of the reliability or confidence associated with an estimate of occupancy, as well as other useful data related to occupancy. The occupancy estimates may be simply displayed to a user or users (e.g., first-responders) via a display device, or may be provided to a controller device that takes some action based on the received occupancy estimate. For instance, the controller device may be a heating, venting and air-conditioning (HVAC) system, elevator control system, emergency egress controllers, as well as others. The data may be provided via any number of communication networks, including telecommunication networks, wireless networks, as well as other well known communication systems.

Figure 9A:
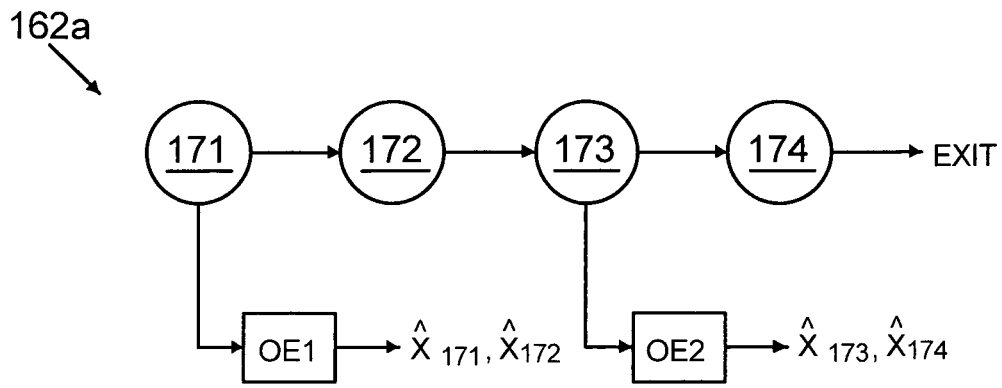
FIGS. 9A-9C are block diagrams illustrating a number of distributed occupancy estimation systems.
Figure 9B:
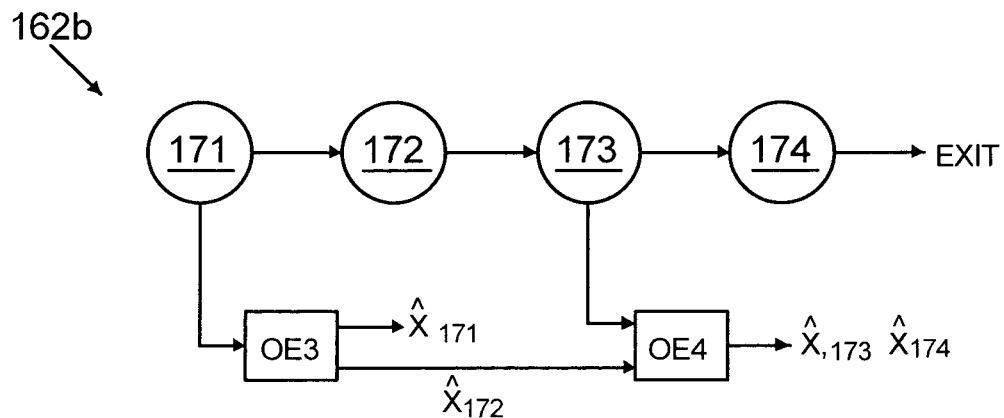
Figure 9C:
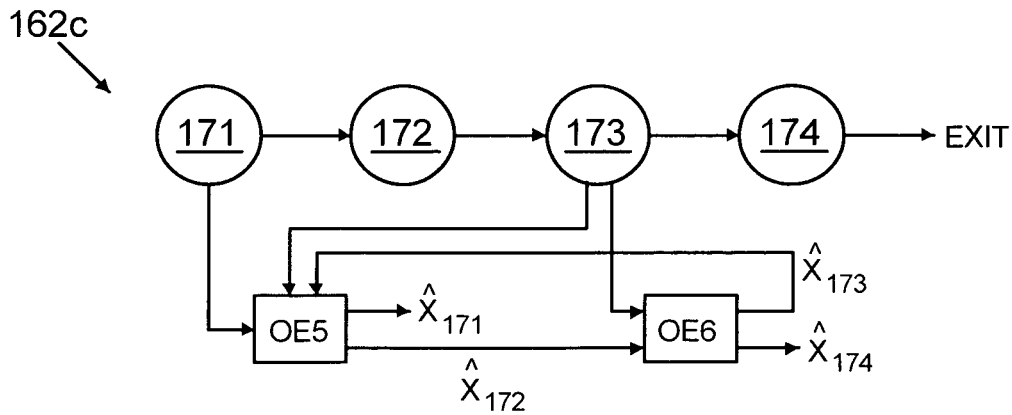

FIGS. 9A-9C illustrate a number of distributed systems 162a, 162b, and 162c for estimating occupancy. This is in contrast with centralized system 152 shown in FIG. 8, in which all sensor data was provided to a single computer or controller 154, which then generated occupancy estimates for an entire region. For the sake of simplicity, the examples shown in FIGS. 9A-9C include only four sub-regions (labeled nodes 171, 172, 173, and 174), although the concepts illustrated in these examples could be expanded to an area or building having any number of sub-regions.

In the embodiment shown in FIG. 9A, distributed system 162a includes sensor devices located in nodes 171 and 173, wherein each sensor device (or associated hardware) includes the capability of processing the data provided by the associated sensor device and applying the occupancy estimator algorithm based on the sensed data and associated occupant traffic models (e.g., single-phase model or KM-based model) and sensor models. In an exemplary embodiment, the occupancy estimation algorithm is implemented with an Extended Kalman Filter which generates based on these inputs an occupancy estimation and a covariance (as well as any other useful statistical outputs). For purposes of this description, the distributed occupancy estimation system 162a that includes both the sensor device and the components used to generate the occupancy estimate, which may include a combination of hardware and software for applying the occupancy estimation algorithm to the sensor data, will be referred to generally as occupancy estimator (OE). In the embodiment shown in FIG. 9A, sensor data observed at node 171 is provided to occupancy estimator OE1, which generates occupancy estimates $\hat{x}_{171}(t)$ and $\hat{x}_{172}(t)$ corresponding to nodes 171 and 172, respectively. Sensor data observed at node 173 is provided to occupancy estimator OE2, which generates occupancy estimates $\hat{x}_{173}(t)$ and $\hat{x}_{174}(t)$ corresponding to nodes 173 and 174, respectively. In the embodiment shown in FIG. 9A, the occupancy estimator OE1 and occupancy estimator OE2 do not share information regarding the occupancy estimates of the respective nodes.

In distributed system 162b shown in FIG. 9B, sensor devices are once again located at nodes 171 and 173. In this embodiment however, occupancy estimate $\hat{x}_{172}(t)$ generated by occupancy estimator OE3 is provided as an input to occupant estimator OE4. A benefit of distributed system 160b is the ability of occupancy estimator OE4 to base occupancy estimates $\hat{x}_{173}(t)$ and $\hat{x}_{174}(t)$ in part on knowledge regarding the occupancy of node 172. For instance, if the occupancy estimate $\hat{x}_{172}(t)$ indicates one or more occupants located in node 172, then occupancy estimator OE4 may predict that in the next time step the occupant located in node 172 will move from node 172 to node 173 (based once again on an egress mode of operations in which occupants move toward an exit connected to node 174), thereby improving the predicted occupancy estimations by incorporating the additional data.

In distributed system 162c shown in FIG. 9C, sensor devices are once again located at nodes 171 and 173. In this embodiment however, occupancy estimate $\hat{x}_{172}(t)$ made by occupancy estimator OE5 is provided as an input to occupancy estimator OE6, and both sensor data from node 173 and occupancy estimate $x_{173}(t)$ are provided as input to occupancy estimator OE5. This embodiment illustrates a distributed application in which both occupancy estimates and sensor data is shared by associated occupancy estimators. A benefit of this system is the ability of occupancy estimators OE5 and OE6 to base occupancy estimates on the additional data made available, thus improving the overall reliability and performance of distributed system 160c.

Communication of occupancy estimations between occupancy estimators may be provided via typical communication networks, including telecommunication networks, local area network (LAN) connections, or via wireless networks. In addition, in some embodiments communication costs are minimized by only sharing occupancy estimates between adjacent nodes/zones, such that only those occupancy estimators monitoring adjacent zones share occupancy estimates. A benefit of employing distributed systems for providing occupancy estimates is the ability of distributed systems to function despite the loss of one or more of the distributed systems.

Although the present invention has been described with reference to preferred embodiments, workers skilled in the art will recognize that changes may be made in form and detail without departing from the spirit and scope of the invention. For example, although a computer system including a processor and memory was described for implementing the occupancy estimation algorithm, any number of suitable combinations of hardware and software may be employed for executing the mathematical functions employed by the occupancy estimation algorithm. In addition, the computer system may or may not be used to provide data processing of received sensor data. In some embodiments, the sensor data may be pre-processed before being provided as an input to the computer system responsible for executing the occupancy estimation algorithm. In other embodiments, the computer system may include suitable data processing techniques to internally process the provided sensor data.

Furthermore, throughout the specification and claims, the use of the term 'a' should not be interpreted to mean "only one", but rather should be interpreted broadly as meaning "one or more". The use of sequentially numbered steps used throughout the disclosure does not imply an order in which the steps must be performed. The use of the term "or" should be interpreted as being inclusive unless otherwise stated.

The invention claimed is:

1. A system for estimating occupancy in a region defined by a plurality of segments, the system comprising:
   a controller that executes an algorithm that generates occupancy estimations associated with the predicted movement of occupants within each of the plurality of segments without using sensor data, wherein the algorithm is a Kinetic Motion (KM)-based model that predicts occupant movement based on modeled distinctions between congested and uncongested portions of each segment; and
   an output operably connected, to the controller to communicate the occupancy estimates generated by the algorithm.

2. The system of claim 1, wherein the algorithm defines the predicted movement of occupants based on an egress-mode of evacuation.

3. The system of claim 1, wherein the algorithm 1s initialized based on an initial distribution of occupants within the region.

4. The system of claim 3, wherein the initial distribution of occupants within the region is based on statistical, simulated, or stored data regarding occupant location within the region.

5. The system of claim 1, wherein the KM-based model generates occupancy estimates based on previous occupancy estimates and one or more state equations that define the congested portion as a queue having a length dependent on a number of occupants located in the congested portion, and the propagation of vacancies through the queue in response to an occupant exiting the congested portion and an occupant entering the queue from a non-congested portion or entrance.

6. The system of claim 5, wherein the state equations predict a number of occupants located in the queue, a number of occupants located in the uncongested portion of the segment, and a number of occupants entering the segment, wherein the number of occupants entering the segments is based on whether the entrance to the segment is modeled as congested or uncongested, wherein the number of occupants entering a congested portion of the segment is dependent on the modeled propagation of vacancies through the queue.

7. The system of claim 1, further including:
an input operably connected to receive sensor data from one or more sensor devices, wherein the algorithm executed by the controller further includes an extended Kalman filter that generates occupancy estimates based on a combination of the sensor data and the predicted movement of occupants generated by the KM-based model.

8. A system for estimating occupancy in a region, the system comprising:
an input operably connected to receive sensor data from one or more sensor devices;
a kinetic motion (KM)-based model that predicts the movement of occupants within a region divided into a plurality of segments without using sensor data, wherein the KM-based model predicts occupant movement based on modeled distinctions between congested and uncongested portions of each segment based on modeling of each segment as including a congested portion and an uncongested portion;
an occupancy estimator operably connected to the input, wherein the occupancy estimator executes an algorithm to generate corrected occupancy estimates for the region based on the received sensor data and predictions of occupant movement generated by the KM-based model; and
an output operably connected to the occupancy estimator to communicate the occupancy estimate generated by the occupancy estimator.

9. The system of claim 8, wherein the KM-based model generates state predictions based on previous corrected estimates generated by the occupancy estimator and one or more state equations defining the predicted movement of occupants.

10. The system of claim 9, wherein the one or more state equation generate state predictions regarding a number of occupants in the congested portion of each segment, a number of occupants in the uncongested portion of each segment, and a number of occupants moving between adjacent segments.

11. The system of claim 10, wherein the state equations related to the number of occupants in the uncongested portions of each segment further define the number of occupants located in a plurality of elementary cells defined within each segment, wherein the state equations predict occupant movement to the adjacent elementary cell in a defined time-step.

12. The system of claim 10, wherein state equations related to the number of occupants in the congested portion of each segment further define the congested portion as a queue having a length that is related to the number of occupants in the queue, and the propagation of vacancies through the queue in response to an occupant exiting the congested area.

13. The system of claim 10, wherein the state equations related to the number of occupants moving between adjacent segments are based, in part, on whether the entrance to a segment is modeled as congested or uncongested, wherein the number of occupants moving through an entrance to a congested portion of the segment is based, in part, on the modeled propagation of vacancies through the queue to the entrance.

14. The system of claim 10, wherein the algorithm executed by the occupancy estimator is an extended Kalman filter that corrects the state estimates generated by the KM-based model with the sensor data provided by the one or more sensor devices.

15. The system of claim 8, wherein the KM-based model in combination with received sensor data, including five video cameras located between adjacent zones and three located at exits, provides an occupancy estimate with an error per room that is a 60% improvement over occupancy estimates generated only with the received sensor data.

16. The system of claim 8, wherein the KM-based model in combination with sensor data, including five video cameras located between adjacent zones, three video cameras located at exits, and motion detection sensors located in each room, provides an occupancy estimate with an error per room that is a 76% improvement over occupancy estimates generated only with the sensor data received from the video cameras alone.

17. The system of claim 8, wherein the corrected occupancy estimate is generated in real-time, wherein updates are provided at one-second intervals.

18. A method for estimating occupancy in a region divided into a plurality of segments, the method comprising:
modeling each of the plurality of segments as containing a congested portion and an uncongested portion;
calculating, without using sensor data, model-based predictions of occupancy within the plurality of segments based on state equations that model occupant movement in the congested portion of each segment, occupant movement in the uncongested portion of each segment, and occupant movement between segments based, in part, on whether an entrance to a particular segment is modeled as congested or uncongested; and
providing the model-based predictions of occupancy as an output.

19. The method of claim 18, further including:
defining initial conditions associated with occupant location within the region based on statistical, simulated, or stored data regarding occupant location within the region.

20. The method of claim 18, wherein calculating model-based predictions of occupancy within the plurality of segments based on state equations that model occupant movement in the congested portion of each segment includes:
modeling the congested portion as a queue having a length defined by the number of occupants located in the congested portion, wherein occupants are modeled as entering the queue based on the distance the queue extends into a segment.

21. The method of claim 20, wherein calculating model-based predictions of occupancy within the plurality of segments based on state equations that model occupant movement in the uncongested portion of each segment includes:
  modeling the uncongested portion as a plurality of elementary cells in which occupants are modeled as traversing one elementary cell in each time step, wherein occupants are modeled as being added to the queue when occupants located in the elementary cell adjacent a tail of the queue are advanced in the next time step.

22. The method of claim 21 wherein calculating model-based predictions of occupancy within the plurality of segments based on state equations that model occupant movement between segments based, in part, on whether an entrance to a particular segment is modeled as congested or uncongested includes:
  generating predictions associated with occupant movement between segments based on a width of an entrance to a segment, density of occupants in an elementary cell when the entrance is to the uncongested portion of the segment, and predicted propagation of vacancies in the queue when the entrance is to the congested portion of the segment.

23. The method of claim 18, further including:
  acquiring sensor data from one or more sensor devices; and
  correcting the model-based prediction of occupancy with the acquired sensor data to generate corrected occupancy estimates.

24. The method of claim 23, wherein correcting the model-based prediction of occupancy with the acquired sensor data to generate corrected occupancy estimates includes:
  applying an extended Kalman filter that generates a mean estimate and a covariance associated with the number of occupants in the congested portion of each segment, the number of occupants in the uncongested portion of each segment, and the number of occupants moving between adjacent segments.

25. The method of claim 24, wherein the extended Kalman filter further generates a mean estimate and a covariance associated with the number of occupants in each elementary cell of each segment.

26. A system for estimating occupancy in a region divided into a plurality of segments, the system comprising:
  means for modeling each of the plurality of segments as containing a congested portion and an uncongested portion;
  means for calculating model-based predictions of occupancy within the plurality of segments based on state equations that model occupant movement in the congested portion of each segment without using sensor data, occupant movement in the uncongested portion of each segment, and occupant movement between segments based in part, on whether an entrance to a particular segment is modeled as congested or uncongested; and
  means for providing the model-based predictions of occupancy as an output.

27. The system of claim 26, further including:
  means for defining initial conditions associated with occupant location within the region based on statistical, simulated, or stored data regarding occupant location within the region.

28. The system of claim 26, wherein the means for calculating model-based predictions of occupancy within the plurality of segments based on state equations includes:
  means for modeling the congested portion as a queue having a length defined by the number of occupants located in the congested portion, wherein occupants are modeled as entering the queue based on the distance the queue extends into a segment;
  means for modeling the uncongested portion as a plurality of elementary cells in which occupants are modeled as traversing one elementary cell in each time step, wherein occupants are modeled as being added to the queue when occupants located in the elementary cell adjacent a tail of the queue are advanced in the next time step; and
  means for generating predictions associated with occupant movement between segments based on a width of an entrance to a segment, density of occupants in an elementary cell when the entrance is to the uncongested portion of the segment, and predicted propagation of vacancies in the queue when the entrance is to the congested portion of the segment.

29. The system of claim 26, further including:
  means for acquiring sensor data from one or more sensor devices; and
  means for correcting the model-based prediction of occupancy with the acquired sensor data to generate corrected occupancy estimates by applying an extended Kalman filter that generates a mean estimate and a covariance associated with the number of occupants in the congested portion of each segment, the number occupants in the uncongested portion of each segment, and the number of occupants moving between adjacent segments.

30. A non-transitory computer readable storage medium encoded with a machine-readable computer program code for generating thereof occupancy estimates for a region, the computer readable storage medium including instructions for causing a controller to implement a method comprising:
  modeling each of the plurality of segments as containing a congested portion and an uncongested portion;
  calculating, without using sensor data, model-based predictions of occupancy within the plurality of segments based on state equations that model occupant movement in the congested portion of each segment, occupant movement in the uncongested portion of each segment, and occupant movement between segments based, in part, on whether an entrance to a particular segment is modeled as congested or uncongested; and
  communicating model-based predictions of occupancy.

* * * * *